(12) United States Patent
Kang et al.

(10) Patent No.: US 10,616,918 B2
(45) Date of Patent: Apr. 7, 2020

(54) APPARATUS AND METHOD FOR PERFORMING NETWORK ENTRY PROCEDURE IN CLOUD CELL COMMUNICATION SYSTEM

(71) Applicant: Samsung Electronics Co. Ltd., Suwon-si, Gyeonggi-do (KR)

(72) Inventors: Hyun-Jeong Kang, Seoul (KR); Rakesh Taori, Suwon-si (KR); Jung-Shin Park, Seoul (KR); Yeong-Moon Son, Yongin-si (KR); Jae-Weon Cho, Seongnam-si (KR); Hyun-kyu Yu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/905,681

(22) Filed: May 30, 2013

(65) Prior Publication Data

US 2013/0322367 A1    Dec. 5, 2013

(30) Foreign Application Priority Data

Jun. 1, 2012   (KR) .................. 10-2012-0059197
Jul. 26, 2012  (KR) .................. 10-2012-0081904

(51) Int. Cl.
*H04L 12/00* (2006.01)
*H04W 74/00* (2009.01)
(Continued)

(52) U.S. Cl.
CPC .......... *H04W 74/006* (2013.01); *H04B 7/022* (2013.01); *H04W 48/16* (2013.01);
(Continued)

(58) Field of Classification Search
CPC ........ H04B 7/24; H04B 7/024; H04B 7/0639; H04B 7/0632; H04B 7/0408;
(Continued)

(56) References Cited

U.S. PATENT DOCUMENTS

2009/0111473 A1*  4/2009  Tao ................. H04W 36/18
                                              455/440
2010/0067450 A1*  3/2010  Balachandran et al. ...... 370/329
(Continued)

FOREIGN PATENT DOCUMENTS

CN    102340888 A    2/2012
EP     0659326 B1    9/2002
(Continued)

OTHER PUBLICATIONS

R1-083653, Network MIMO in LTE- Advanced, XP050317006. 3GPP TSG RAN WG1 Meeting #54bis Prague, Czech Republic, Sep. 29-Oct. 3, 2008.

(Continued)

*Primary Examiner* — Noel R Beharry
*Assistant Examiner* — Lionel Preval
(74) *Attorney, Agent, or Firm* — Jefferson IP Law, LLP

(57) ABSTRACT

A method for performing a network entry procedure by a Mobile Station (MS) in a cloud cell communication system is provided. The method includes determining whether there is an arbitrary cloud cell member candidate Base Station (BS) as a cloud cell member candidate BS which has transmitted a downlink synchronization signal with a signal strength, if there is the arbitrary cloud cell member candidate BS, determining the arbitrary cloud cell member candidate BS as a final cloud cell member candidate BS which will perform a cooperative communication with the master BS, transmitting an access request message including information on the final cloud cell member candidate BS to the (Continued)

master BS, and receiving an access response message including information on a cloud cell member BS from the master BS.

22 Claims, 11 Drawing Sheets

(51) Int. Cl.
*H04W 48/16* (2009.01)
*H04B 7/022* (2017.01)
*H04W 48/20* (2009.01)
*H04W 74/08* (2009.01)
*H04W 36/00* (2009.01)

(52) U.S. Cl.
CPC ...... *H04W 74/004* (2013.01); *H04W 36/0069* (2018.08); *H04W 48/20* (2013.01); *H04W 74/0833* (2013.01)

(58) Field of Classification Search
CPC .. H04B 7/0413; H04B 7/0621; H04B 7/0626; H04W 36/18; H04W 36/04; H04W 36/40; H04W 72/04; H04W 72/082; H04W 72/085; H04W 72/046; H04W 24/02; H04W 36/0083; H04W 36/00; H04W 36/08; H04W 36/30; H04W 72/1289; H04W 74/006; H04L 5/0035; H04L 1/0026; H04L 1/20; H04J 11/0053
USPC ............... 370/329, 254, 252; 455/422.1, 513
See application file for complete search history.

(56) References Cited

U.S. PATENT DOCUMENTS

| | | | |
|---|---|---|---|
| 2010/0124917 A1* | 5/2010 | Miller et al. ............... | 455/422.1 |
| 2010/0136994 A1 | 6/2010 | Kim et al. | |
| 2010/0173660 A1* | 7/2010 | Liu ...................... | H04W 48/16 |
| | | | 455/501 |
| 2010/0267341 A1* | 10/2010 | Bergel ................. | H04B 7/0617 |
| | | | 455/63.1 |
| 2010/0273514 A1* | 10/2010 | Koo ....................... | H04B 7/024 |
| | | | 455/501 |
| 2011/0013710 A1* | 1/2011 | Xiao ...................... | H04B 7/024 |
| | | | 375/260 |
| 2011/0171955 A1* | 7/2011 | Acharya ............. | H04W 84/042 |
| | | | 455/434 |
| 2011/0207487 A1 | 8/2011 | Yang et al. | |
| 2011/0218010 A1* | 9/2011 | Hoymann .............. | H04B 7/024 |
| | | | 455/513 |
| 2012/0020248 A1* | 1/2012 | Granlund et al. ........... | 370/254 |
| 2012/0046038 A1 | 2/2012 | Gao et al. | |
| 2012/0178462 A1* | 7/2012 | Kim .................... | H04W 72/048 |
| | | | 455/450 |
| 2012/0281544 A1* | 11/2012 | Anepu ................... | H04B 7/024 |
| | | | 370/241 |
| 2012/0300714 A1* | 11/2012 | Ng .................... | H04W 56/0045 |
| | | | 370/329 |
| 2013/0021925 A1* | 1/2013 | Yin et al. ...................... | 370/252 |
| 2013/0128763 A1* | 5/2013 | Shang .................. | H04W 48/16 |
| | | | 370/252 |
| 2013/0142054 A1* | 6/2013 | Ahmadi ................. | H04B 7/024 |
| | | | 370/252 |
| 2013/0165122 A1* | 6/2013 | Tanaka .................. | H04B 7/024 |
| | | | 455/436 |

FOREIGN PATENT DOCUMENTS

| | | | |
|---|---|---|---|
| KR | 10-2007-0005419 A | 1/2007 | |
| KR | 10-2007-0110180 A | 11/2007 | |
| KR | 10-2010-0038764 A | 4/2010 | |
| WO | 2011-006451 A | 1/2011 | |
| WO | 2011-116833 A1 | 9/2011 | |
| WO | WO 2012022159 A1 * | 2/2012 | ............ H04W 48/16 |
| WO | 2012-044148 A1 | 4/2012 | |

OTHER PUBLICATIONS

European Search Report dated Jul. 31, 2018, issued in the European Application No. 13 796 836.8-1214.

* cited by examiner

APPARATUS AND METHOD FOR PERFORMING NETWORK ENTRY PROCEDURE IN CLOUD CELL COMMUNICATION SYSTEM

PRIORITY

This application claims the benefit under 35 U.S.C. § 119(a) of a Korean patent application filed in the Korean Intellectual Property Office on Jun. 1, 2012 and assigned Serial No. 10-2012-0059197, and a Korean patent application filed in the Korean Intellectual Property Office on Jul. 26, 2012 and assigned Serial No. 10-2012-0081904, the entire disclosures of each of which is hereby incorporated by reference.

BACKGROUND OF THE INVENTION

1. Field of the Invention

The present invention relates to an apparatus and method for a cloud cell communication system. More particularly, the present invention relates to an apparatus and method for performing a network entry procedure in a cloud cell communication system.

2. Description of the Related Art

A wireless communication system has evolved to provide a high-speed large-capacity data service according to user's various requirements. So, the wireless communication system considers using a high-frequency band such as a millimeter Wave (mmW) in order to support the high-speed large-capacity data service.

Recently, a cloud cell communication system in which a plurality of Base Stations (BSs) provides a service to a Mobile Station (MS) by cooperating with one another, that is, a multiple BS cooperation scheme, has been proposed.

However, if a high-frequency band is used, there is a high probability for a case where link loss between an MS and a BS is large, and received signal strength rapidly changes.

So, in a wireless communication system using a high-frequency band, if an MS performs a network entry procedure with one BS, there is a high probability for signal attenuation between the MS and the BS, so this signal attenuation may cause the MS to fail in the network entry procedure. Specially, since the network entry procedure includes procedures for the MS to perform a communication such as an uplink/downlink synchronization acquisition procedure, a basic capability negotiation procedure, an authentication procedure, and a registration procedure, so if the failure in the network entry procedure occurs, the MS may not perform a communication operation.

Therefore, there is a need for a scheme for an MS to reliably perform a network entry procedure by using a high-frequency band in a cloud cell communication system.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to propose an apparatus and method for performing a network entry procedure in a cloud cell communication system.

Another aspect of the present invention is to propose an apparatus and method for performing a network entry procedure using a multiple Base Station (BS) cooperation scheme in a cloud cell communication system.

Another aspect of the present invention is to propose an apparatus and method for forming cloud cell for effectively performing a network entry procedure in a cloud cell communication system.

Another aspect of the present invention is to propose an apparatus and method for forming cloud cell after performing a network entry procedure in a cloud cell communication system.

In accordance with an aspect of the present invention, a cloud cell communication system is provided. The cloud cell communication system includes a Mobile Station (MS) for determining whether there is an arbitrary cloud cell member candidate BS as a cloud cell member candidate BS which has transmitted a downlink synchronization signal with a signal strength, which has a difference from a signal strength of a downlink synchronization signal, which has been transmitted from a master BS as a cloud cell member candidate BS which transmits a downlink synchronization signal with maximal signal strength among a plurality of cloud cell member candidate BSs, that is less than a preset threshold signal strength difference value, if there is the arbitrary cloud cell member candidate BS, determining the arbitrary cloud cell member candidate BS as a final cloud cell member candidate BS which will perform a cooperative communication with the master BS, transmitting an access request message including information on the final cloud cell member candidate BS to the master BS, and receiving an access response message including information on a cloud cell member BS from the master BS.

In accordance with another aspect of the present invention, a cloud cell communication system is provided. The cloud cell communication system includes a master BS for receiving an access request message including information on a final cloud cell member candidate BS from an MS, performing a cooperative procedure for including the final cloud cell member candidate BS to a cloud cell with the final cloud cell member candidate BS, including the final cloud cell member candidate BS to the cloud cell, and transmitting an access response message including information on the cloud cell member BS to the MS, wherein the master BS is a master BS as a cloud cell member candidate BS which transmits a downlink synchronization signal with maximal signal strength among a plurality of cloud cell member candidate BSs, and the final cloud cell member candidate BS is a cloud cell member candidate BS which has transmitted a downlink synchronization signal with a signal strength which has a difference from a signal strength of a downlink synchronization signal, which has been transmitted from the master BS, that is less than a preset threshold signal strength difference value.

In accordance with another aspect of the present invention, a cloud cell communication system is provided. The cloud cell communication system includes a cloud cell member candidate BS for receiving a cloud cell formation request message for including the cloud cell member candidate BS to a cloud cell from a master BS, performing a cloud cell member BS join procedure for joining the cloud cell member candidate BS as a cloud cell member BS, and transmitting a cloud cell formation response message as a response message to the cloud cell formation request message to the master BS, wherein the master BS is a master BS as a cloud cell member candidate BS which transmits a downlink synchronization signal with maximal signal strength among a plurality of cloud cell member candidate BSs, and the final cloud cell member candidate BS is a cloud cell member candidate BS which has transmitted a downlink synchronization signal with a signal strength which has a difference from a signal strength of a downlink synchronization signal which has been transmitted from the master BS, that is less than a preset threshold signal strength difference value.

In accordance with another aspect of the present invention, a cloud cell communication system is provided. The cloud cell communication system includes an MS for performing a network entry procedure with a master BS, for receiving neighbor BS information including information on neighbor BSs from the master BS, for performing a signal measurement procedure for the neighbor BSs, for reporting the measured result to the master BS, after reporting the measured result, for receiving information on a cloud cell member BS from the master BS, and for performing a cooperative communication procedure for performing a cooperative communication with the cloud cell member BS.

In accordance with another aspect of the present invention, a cloud cell communication system is provided. The cloud cell communication system includes a master BS for performing a network entry procedure with an MS, for transmitting neighbor BS information including information on neighbor BSs to the MS, for receiving a signal measurement result on the neighbor BSs from the MS, for determining whether there is a need for forming a cloud cell for the MS based on the signal measurement result, for performing a cloud cell formation procedure for forming a cloud cell member candidate BS among the neighbor BSs as a cloud cell if there is a need for forming a cloud cell for the MS, and after performing the cloud cell formation procedure, for transmitting information on a cloud cell member BS to the MS.

In accordance with another aspect of the present invention, there a method for performing a network entry procedure by an MS in a cloud cell communication system is provided. The method includes determining whether there is an arbitrary cloud cell member candidate BS as a cloud cell member candidate BS which has transmitted a downlink synchronization signal with a signal strength, which has a difference from a signal strength of a downlink synchronization signal which has been transmitted from a master BS as a cloud cell member candidate BS which transmits a downlink synchronization signal with maximal signal strength among a plurality of cloud cell member candidate BSs, that is less than a preset threshold signal strength difference value, if there is the arbitrary cloud cell member candidate BS, determining the arbitrary cloud cell member candidate BS as a final cloud cell member candidate BS which will perform a cooperative communication with the master BS, for transmitting an access request message including information on the final cloud cell member candidate BS to the master BS, and for receiving an access response message including information on a cloud cell member BS from the master BS.

In accordance with another aspect of the present invention, a method for performing a network entry procedure by a master BS in a cloud cell communication system is provided. The method includes receiving an access request message including information on a final cloud cell member candidate BS from an MS, performing a cooperative procedure for including the final cloud cell member candidate BS to a cloud cell with the final cloud cell member candidate BS, and including the final cloud cell member candidate BS to the cloud cell, and for transmitting an access response message including information on the cloud cell member BS to the MS, wherein the master BS is a master BS as a cloud cell member candidate BS which transmits a downlink synchronization signal with maximal signal strength among a plurality of cloud cell member candidate BSs, and the final cloud cell member candidate BS is a cloud cell member candidate BS which has transmitted a downlink synchronization signal with a signal strength which has a difference from signal strength of a downlink synchronization signal which has been transmitted from the master BS, that is less than a preset threshold signal strength difference value.

In accordance with another aspect of the present invention, a method for performing a network entry procedure by a cloud cell member candidate BS in a cloud cell communication system is provided. The method includes receiving a cloud cell formation request message for including the cloud cell member candidate BS to a cloud cell from a master BS, for performing a cloud cell member BS join procedure for joining the cloud cell member candidate BS as a cloud cell member BS, and for transmitting a cloud cell formation response message as a response message to the cloud cell formation request message to the master BS, wherein the master BS is a master BS as a cloud cell member candidate BS which transmits a downlink synchronization signal with maximal signal strength among a plurality of cloud cell member candidate BSs, and the final cloud cell member candidate BS is a cloud cell member candidate BS which has transmitted a downlink synchronization signal with a signal strength which has a difference from a signal strength of a downlink synchronization signal which has been transmitted from the master BS is less than a preset threshold signal strength difference value.

In accordance with another aspect of the present invention, a method for performing a network entry procedure by an MS in a cloud cell communication system is provided. The method includes performing a network entry procedure with a master BS, receiving neighbor BS information including information on neighbor BSs from the master BS, performing a signal measurement procedure for the neighbor BSs, and reporting a signal measurement result to the master BS, after reporting the signal measurement result, receiving information on a cloud cell member BS from the master BS, and performing a cooperative communication procedure for performing a cooperative communication with the cloud cell member BS.

In accordance with another aspect of the present invention, a method for performing a network entry procedure by a master BS in a cloud cell communication system is provided. The method includes performing a network entry procedure with an MS, transmitting neighbor BS information including information on neighbor BSs to the MS, receiving a signal measurement result on the neighbor BSs from the MS, determining whether there is a need for forming a cloud cell for the MS based on the signal measurement result, performing a cloud cell formation procedure for forming a cloud cell member candidate BS among the neighbor BSs as a cloud cell if there is a need for forming a cloud cell for the MS, and after performing the cloud cell formation procedure, transmitting information on a cloud cell member BS to the MS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure proposes an apparatus and method for performing a network entry procedure in a cloud cell communication system.

The present disclosure proposes an apparatus and method for performing a network entry procedure using a multiple Base Station (BS) cooperation scheme in a cloud cell communication system.

The present disclosure proposes an apparatus and method for forming a cloud cell for effectively performing a network entry procedure in a cloud cell communication system.

The present disclosure proposes an apparatus and method for forming a cloud cell after performing a network entry procedure in a cloud cell communication system.

Further, it will be understood by those of ordinary skill in the art that an apparatus and method for performing a network entry procedure proposed in the present disclosure may be applied to both a case where a Mobile Station (MS) performs an initial network entry procedure and a case where the MS performs a network re-entry procedure after waking up from an idle mode.

Figure 1:
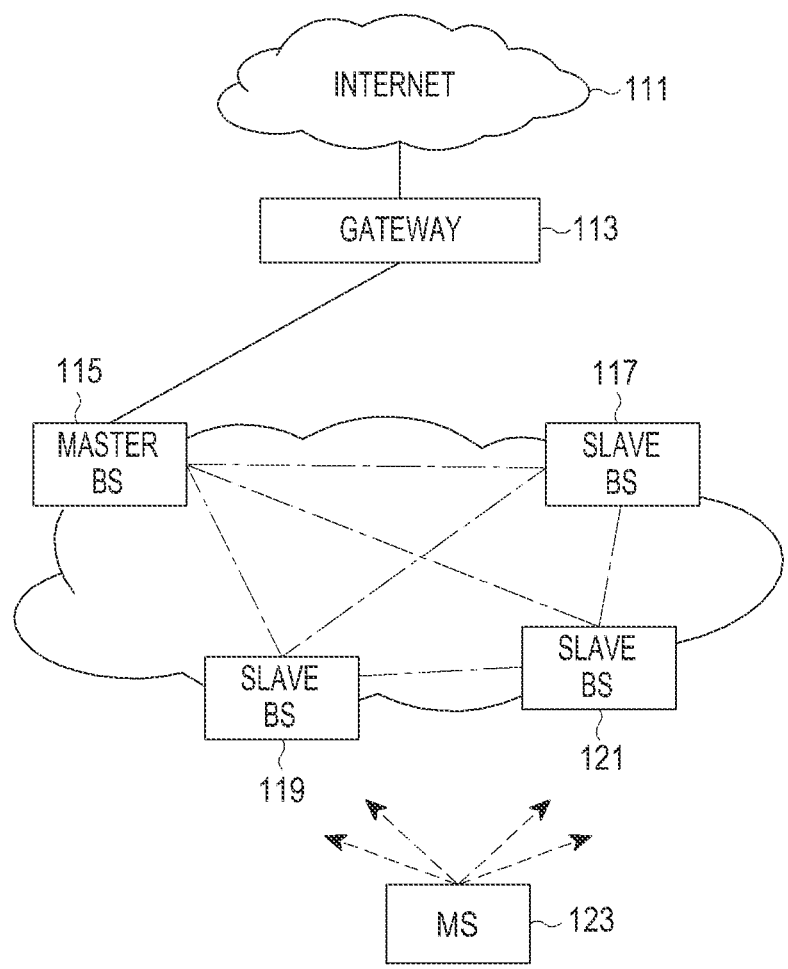
FIG. 1 schematically illustrates a structure of a cloud cell communication system according to an exemplary embodiment of the present invention.

FIG. 1 schematically illustrates a structure of a cloud cell communication system according to an exemplary embodiment of the present invention.

Referring to FIG. 1, the cloud cell communication system includes an interne 111, a gateway 113, a master BS 115, slave BSs 117, 119, 121, and an MS 123. The master BS 115 and the slave BSs 117, 119, 121 forms a cloud cell, BSs included in the cloud cell, i.e., the master BS 115 and the slave BSs 117, 119, 121 joins in data transmission for the MS 123 using a multiple BS cooperation scheme. In FIG. 1, the number of slave BSs is 3, however, it will be understood by those of ordinary skill in the art that the number of the slave BSs is not limited. Specially, in an exemplary embodiment of the present invention, a network entry procedure in which the MS 123 performs an authentication and capacity negotiation procedure after forming the slave BSs 117, 119, 121 as a cloud cell with the master BS 115 is proposed. The network entry procedure will be described below, so a detailed description for the network entry procedure will be omitted herein for brevity.

Figure 2A:
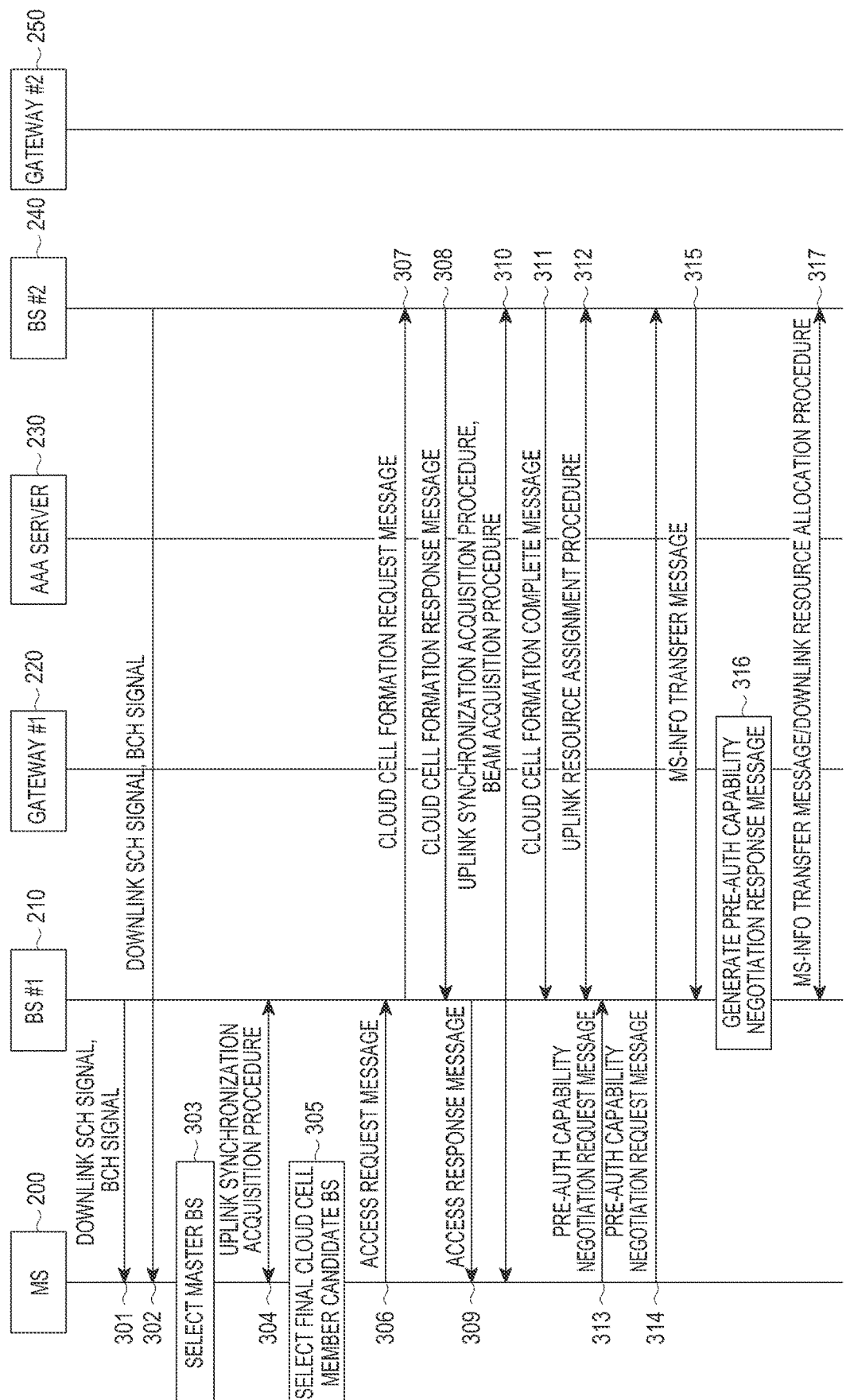
FIGS. 2A to 2C are signal flow diagrams schematically illustrating a process for performing a network entry procedure in a cloud cell communication system according to an exemplary embodiment of the present invention.
Figure 2B:
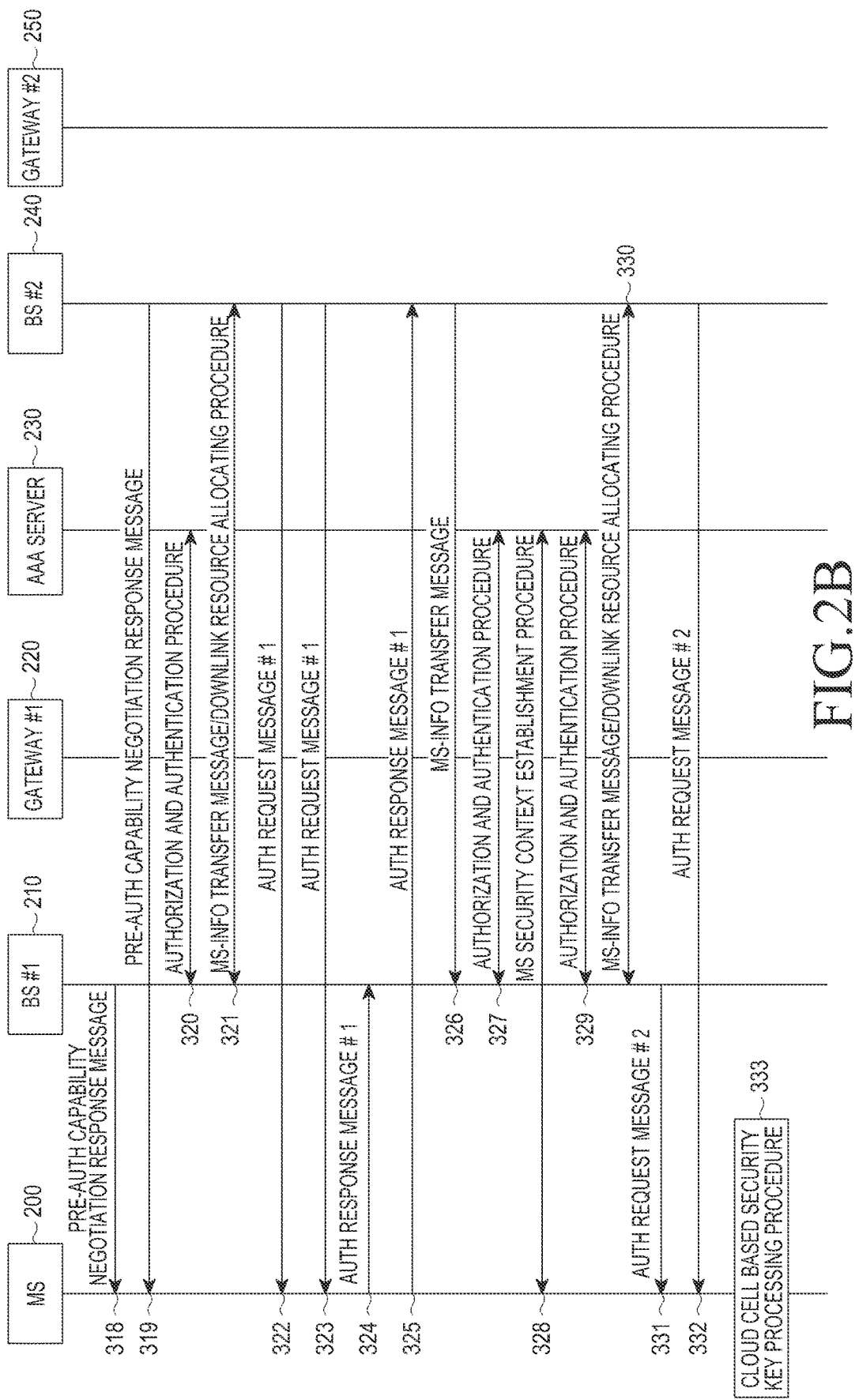
Figure 2C:
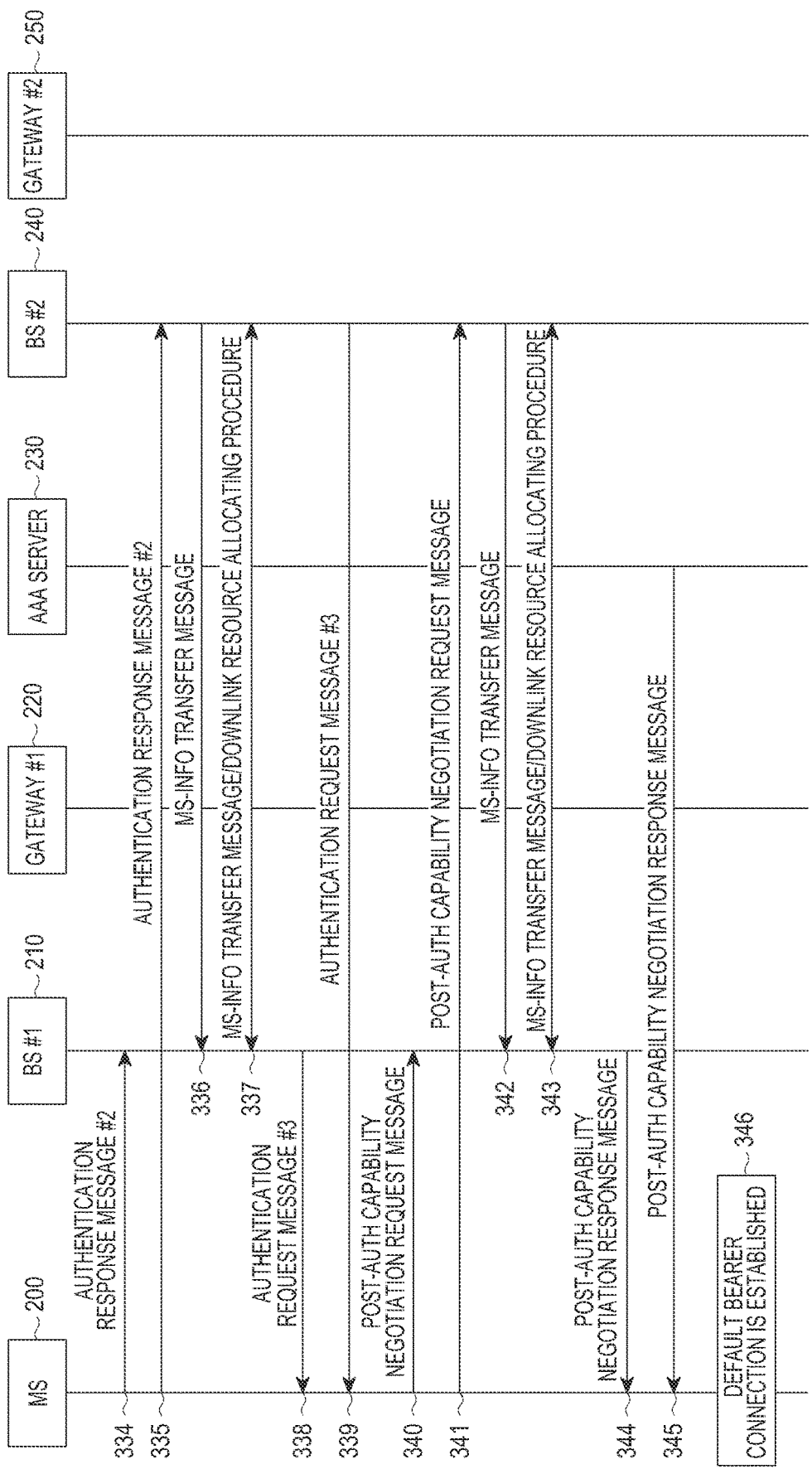

FIGS. 2A to 2C are signal flow diagrams schematically illustrating a process for performing a network entry procedure in a cloud cell communication system according to an exemplary embodiment of the present invention.

Referring to FIGS. 2A to 2C, the cloud cell communication system includes an MS 200, a BS #1 210, a gateway #1 220, an Authorization, Authentication and Accounting (AAA) server 230, a BS #2 240, and a gateway #2 250. In FIGS. 2A to 2C, the BS #1 210 and the gateway #1 220 are implemented as separate entities. However, it will be understood by those of ordinary skill in the art that the BS #1 210 and the gateway #1 220 may be implemented as an integrative entity. Similarly, the BS #2 240 and the gateway #2 250 are implemented as separate entities. However, it will be understood by those of ordinary skill in the art that the BS #2 240 and the gateway #2 250 may be implemented as an integrative entity. In FIGS. 2A to 2C, cloud cell member candidate BSs for forming a cloud cell are the BS #1 210 and the BS #2 240, however, it will be understood by those of ordinary skill in the art that the number of the cloud cell member candidate BSs is equal to or greater than 3.

Firstly, each of the BS #1 210 and the BS #2 240 transmits a downlink Synchronization Channel (SCH) signal and a Broadcast Channel (BCH) signal in steps 301 and 302. If the cloud cell communication system supports a beamforming scheme, the BCH signal transmitted from each of the BS #1 210 and the BS #2 240 includes a beam IDentifier (ID) as well as System Information (SI). In FIGS. 2A to 2C, a downlink synchronization signal is a downlink SCH signal, however, it will be understood by those of ordinary skill in the art that the downlink synchronization signal is changed to another signal from which the MS 200 may acquire synchronization.

The MS 200 receives the downlink SCH signal and the BCH signal transmitted from each of the BS #1 210 and the BS #2 240, and measures signal strength of the received downlink SCH signal, e.g., Signal to Interference and Noise Ratio (SINR). In FIGS. 2A to 2C, the MS 200 measures an SINR of a downlink SCH signal in order to select cloud cell member candidate BSs, however, it will be understood by those of ordinary skill in the art that the MS 200 may select the cloud cell member candidate BSs by measuring other parameters such as a Signal to Noise Ratio (SNR), or a Received Signal Strength Indication (RSSI) as well as the SINR. If there is an SINR which is equal to or greater than a preset threshold SINR among the measured SINRs, the MS 200 stores information on a BS which has transmitted a related downlink SCH signal. In FIGS. 2A to 2C, the cloud cell member candidate BSs are the BS #1 210 and the BS #2 240, however, it will be understood by those of ordinary skill in the art that the number of the cloud cell member candidate BSs is equal to or greater than 3, so there are a plurality of cloud cell member candidate BSs which have transmitted a downlink SCH signal with an SINR equal to or greater than the threshold SINR.

In FIGS. 2A to 2C, it will be assumed that each of the BS #1 210 and the BS #2 240 is a cloud cell member candidate BS which has transmitted a downlink SCH signal with an SINR equal to or greater than a threshold SINR. The threshold SINR is an SINR which is determined by considering channel status on which link status on which the MS 200 may normally perform the network entry procedure may be provided, and it will be understood by those of ordinary skill in the art that a scheme for determining the threshold SINR may be implemented in various forms. If the cloud cell communication system supports a beamforming scheme, the MS 200 selects a master BS by performing a beam acquisition procedure on which the MS 200 measures an SINR for a downlink SCH signal and selects an optimal beam direction by considering each beam direction in step 303. The MS 200 does not perform a beam acquisition procedure for all cloud cell member candidate BSs, but only performs a beam acquisition procedure for a cloud cell member candidate BS which has transmitted a downlink SCH signal with an SINR equal to or greater than the threshold SINR. In FIGS. 2A to 2C, it will be assumed that each of downlink SCH signals which have been transmitted from the BS #1 210 and the BS #2 240 has an SINR equal to or greater than the threshold SINR, so the MS 200 performs the beam acquisition procedure for each of the BS #1 210 and the BS #2 240. In FIGS. 2A to 2C, it will be assumed that an SINR of a downlink SCH signal which has transmitted from the BS #1 210 has a maximal SINR among SINRs of downlink SCH signals which have transmitted from all of the cloud cell member candidate BSs, so the BS #1 210 becomes a master BS of the MS 200.

The MS 200 performs an uplink synchronization acquisition procedure with the BS #1 210 as the master BS in step 304. The MS 200 determines whether there is an arbitrary cloud cell member candidate BS as a cloud cell member candidate BS which has transmitted a downlink SCH signal with an SINR, which has a difference from an SINR of a downlink SCH signal which has been transmitted from the BS #1 210 is less than a preset threshold SINR difference value A, and selects a final cloud cell member candidate BS according to the determined result in step 305. The threshold SINR difference value is determined by considering an SINR on which a cooperative communication gain may be acquired if the master BS, i.e., the BS #1 210 and an arbitrary BS perform cooperative communication. That is, the threshold SINR difference value is set for selecting a cloud cell member candidate BS which may perform cooperative communication with the master BS, i.e., the BS #1 210 upon performing the network entry procedure for the MS 200. If there is the arbitrary cloud cell member candidate BS, the MS 200 selects the arbitrary cloud cell member candidate BS as the final cloud cell member candidate BS. In FIGS. 2A to 2C, it will be assumed that the BS #2 240 is selected as the final cloud cell member candidate BS.

The MS 200 transmits an access request message to the BS #1 210 in step 306. The access request message includes information on the selected final cloud cell member candidate BS, i.e., the BS #2 240, and the information on the selected final cloud cell member candidate BS includes information on the downlink SCH signal which has transmitted from the arbitrary cloud cell member candidate BS, BS ID information, SINR information of the downlink SCH signal. If the cloud cell communication system supports a beamforming scheme, the information on the selected final cloud cell member candidate BS includes optimal beam ID information selected for the final cloud cell member candidate BS. If the MS 200 performs a cloud cell communication through one or more than BSs, the information on the selected final cloud cell member candidate BS includes capability information which the MS 200 may support.

The BS #1 210 performs a cloud cell formation procedure for including the final cloud cell member candidate BS, i.e., BS #2 240 to a cloud cell member BS based on the access request message, and a detailed description thereof will be provided below.

The BS #1 210 transmits a cloud cell formation request message to the BS #2 240 in step 307. The cloud cell formation request message includes an MS ID of the MS 200, and a beam ID for the BS #2 240 which the MS 200 has selected if the cloud cell communication system supports the beamforming scheme. The cloud cell formation request message includes indication information indicating whether the BS #2 240 will use a cloud cell upon serving downlink data and uplink data, or downlink data, or uplink data for the MS 200. The cloud cell formation request message may include capability information used for the BS #2 240 to provide cloud cell communication to the MS 200 by cooperating with the BS #1 210 based on the capability information, and the capability information includes system load information of the BS #2 240, BS communication capability information of the BS #2 240, etc.

The cloud cell formation response message includes capability information used for the BS #2 240 to provide cloud cell communication to the MS 200, and the capability information includes the BS communication capability information of the BS #2 240, the system load information of the BS #2 240, etc. If the BS #2 240 joins in a cloud cell communication for providing uplink data service for the MS 200, the cloud cell formation response message includes uplink random access information for the BS #2 240, and the uplink random access information includes Random Access Channel (RACH) information. Upon receiving the cloud cell formation request message from the BS #1 210, the BS #2 240 performs a cloud cell member BS join procedure for joining the BS #2 240 as a cloud cell member BS for the MS 200, and transmits a cloud cell formation response message as a response message to the cloud cell formation request message to the BS #1 210 in step 308. The uplink random access information includes information on a dedicated uplink random access resource which only the MS 200 may use. The cloud cell formation response message includes Channel Quality Indicator (CQI) information which the MS 200 will use for communicating with the BS #2 240 and HARQ channel information. The cloud cell member BS join procedure includes a signal transmitting/receiving procedure among the gateway #1 220, the AAA server 230, and the gateway #2 250, and includes a path establishment procedure used for the BS #1 210 and the BS #2 240 to provide a cooperative communication to the MS 200, etc. The cloud cell member BS join procedure may include various procedures as well as the path management procedure, a detailed description for the cloud cell member BS join procedure will be omitted for brevity.

After receiving the cloud cell formation response message from the BS #2 240, the BS #1 210 transmits an access response message as a response message to the access request message to the MS 200 in step 309. The access response message includes cloud cell member BS information for the BS #2 240 as a cloud cell member BS which is formed as a cloud cell for the MS 200. The cloud cell member BS information includes a BS ID, uplink random access information, CQI channel information, HARQ channel information for a related BS. The access response message includes capability information which the MS 200 should support upon performing cloud cell communication through the one or more than BSs.

The MS 200 receiving the access response message from the BS #1 210 performs a cooperative communication procedure for performing cooperative communication with the BS #2 240, i.e., uplink synchronization acquisition procedure and a beam acquisition procedure using information included in the access response message in step 310. Upon completing the cooperative communication procedure with the MS 200, the BS #2 240 transmits a cloud cell formation complete message to the BS #1 210 in step 311. The cloud cell formation complete message includes MS ID information of the MS 200.

After completing the cloud cell formation, the BS #1 210 performs an uplink resource assignment procedure with the BS #2 240 for allocating an uplink resource to the MS 200 in order that the MS 200 may transmit a pre-auth capability negotiation request message in step 312.

Once the uplink resource assignment procedure is completed, the MS 200 transmits a pre-auth capability negotiation request message to the BS #1 210 and the BS #2 240 in steps 313, and 314. The pre-auth capability negotiation request message transmitted from the MS 200 includes capability information used for the MS 200 to communicate using a multiple BS cooperative scheme, i.e., a cloud cell. If the MS 200 receives a downlink service using the multiple BS cooperation scheme, the pre-auth capability negotiation request message further includes a parameter which the MS supports in a downlink communication with one or more than one BSs. If the MS 200 further receives an uplink service using the multiple BS cooperation scheme, the pre-auth capability negotiation request message further includes a parameter which the MS supports in an uplink communication with one or more than one BSs. After receiving the pre-auth capability negotiation request message, the BS #2 240 detects the pre-auth capability negotiation information of the MS 200 included in the received pre-auth capability negotiation request message, processes the pre-auth capability negotiation information of the MS 200 using the detected pre-auth capability negotiation information, includes the processed pre-auth capability negotiation information into an MS-info transfer message, and transmits the MS-info transfer message to the BS #1 210 in step 315.

The BS #1 210 processes pre-auth capability negotiation information using information used in the pre-auth capability negotiation request message received from the MS 200 and the MS-info transfer message received from the BS #2 240, and generates a pre-auth capability negotiation response message as a response message to the pre-auth capability negotiation request message in step 316. The BS #1 210 includes information for the pre-auth capability negotiation response message into an MS-info transfer message and transmits the MS-info transfer message to the BS #2 240, and performs a downlink resource allocation procedure with the BS #2 240 in order to transmit the pre-auth capability negotiation response message to the MS 200 in step 317. Each of the BS #1 210 and the BS #2 240 transmits the pre-auth capability negotiation response message to the MS 200 using a downlink resource allocated according to the downlink resource allocation procedure described in step 317 in steps 318, and 319. After transmitting the pre-auth capability negotiation response message to the MS 200, the BS #1 210 performs an authorization and authentication procedure for the MS 200 with the AAA server 230 in step 320. The authorization and authentication procedure is performed using an MS ID of the MS 200, there may be various schemes for performing the authorization and authentication procedure, and a detailed description will be omitted for brevity. After performing the authorization and authentication procedure for the MS 200 with the AAA server 230, the BS #1 210 transmits authorization and authentication information for the MS 200 acquired from the authorization and authentication procedure to the BS #2 240, and performs a procedure for allocating a downlink resource to be used for transmitting an auth request message #1 to the MS 200 with the BS #2 240 in step 321.

Each of the BS #1 210 and the BS #2 240 transmits an auth request message #1 to the MS 200 using a downlink resource allocated according to the downlink allocation procedure described in step 321 in steps 322, and 323. After receiving the auth request message #1 from each of the BS #1 210 and the BS #2 240, the MS 200 performs a related authentication operation and transmits an auth response message #1 as a response message to the auth request message #1 to each of the BS #1 210 and the BS #2 240 in steps 324, and 325.

The BS #2 240 includes information included in the auth response message #1 received from the MS 200 into an MS-info transfer message and transmits the MS-info transfer message to the BS #1 210 in step 326. The BS #1 210 performs an authorization and authentication procedure with the AAA server 230 using information on the auth response message #1 received from the MS 200 described in step 324 and information on the auth response message #1 of the MS 200 included in the MS-info transfer message received from the BS #2 240 described in step 326 in step 327. The authorization and authentication procedure is performed using an MS ID of the MS 200.

The MS 200 performs an MS security context establishment procedure with the AAA server 230 in step 328. The MS security context establishment procedure includes a procedure in which the MS generates a security key used for communicating with each of the BS #1 210 and the BS #2 240.

The BS #1 210 and the AAA server 230 perform an authorization and authentication procedure for the MS 200 using the MS ID of the MS 200 and a security context in step 329. After performing the authorization and authentication procedure with the AAA server 230, the BS #1 210 transmits authorization and authentication information for the MS 200 acquired from the authorization and authentication procedure to the BS #2 240, and performs a procedure for allocating a downlink resource to be used for transmitting an auth request message #2 to the MS 200 with the BS #2 240 in step 330. Each of the BS #1 210 and the BS #2 240 transmits an auth request message #2 to the MS 200 using a downlink resource allocated according to the downlink resource allocation procedure described in step 330 in steps 331, and 332.

After receiving the authentication request message #2 from each of the BS #1 210 and the BS #2 240, the MS 200 performs a cloud cell based security key processing procedure for generating security key information used for a cloud cell operation in step 333. After performing the cloud cell based security key processing procedure, the MS 200 transmits an authentication response message #2 including security key information generated according to the cloud cell based security key processing procedure to each of the BS #1 210 and the BS #2 240 in steps 334, and 335.

After receiving the authentication response message #2, the BS #2 240 includes security key information included in the authentication response message #2 into an MS-info transfer message and transmits the MS-info transfer message to the BS #1 210 in step 336. If the security key information used for the cloud cell operation is managed per each cloud cell member BS, step 336 may be omitted. The BS #1 210 transmits information used for transmitting an authentication request message #3 to the MS 200 to the BS #2 240, and performs a downlink resource allocation procedure for allocating a downlink resource to be used for transmitting the authentication request message #3 to the MS 200 with the BS #2 240 in step 337.

Each of the BS #1 210 and the BS #2 240 transmits the authentication request message #3 to the MS 200 using the downlink resource allocated in step 337 in steps 338, and 339. After steps 301 to step 339 have been completed, the BS #1 210 and the BS #2 240 share cloud cell security key information to be applied to the MS 200.

After receiving the authentication request message #3 from each of the BS #1 210 and the BS #2 240, the MS 200 transmits a post-auth capability negotiation request message to each of the BS #1 210 and the BS #2 240 in steps 340, and 341. An uplink resource used for transmitting the post-auth capability negotiation request message is allocated by performing an uplink resource allocation procedure between the BS #1 210 and the BS #2 240 after steps 338 and 339 (not shown in FIGS. 2A to 2C).

After receiving the post-auth capability negotiation request message from the MS 200, the BS #2 240 includes post-auth capability negotiation information into an MS-info transfer message and transmits the MS-info transfer message to the BS #1 210 in step 342. The BS #1 210 transmits information on a post-auth capability negotiation response message for the MS 200, and performs a procedure for allocating a downlink resource to be used for transmitting the post-auth capability negotiation response message to the MS 200 with the BS #2 240 in step 343. Each of the BS #1 210 and the BS #2 240 transmits a post-auth capability negotiation response message to the MS 200 using the downlink resource allocated in step 343 in steps 344, and 345. Hence, a default bearer connection is established between the MS receiving the post-auth capability negotiation response message and the BS #1 210 in step 346. The default bearer connection may be used for a cloud cell communication among the MS 200, the BS #1 210 and the BS #2 240, and information such as an ID of the default bearer connection, and a Quality of Service (QoS) parameter is shared with the BS #1 210 and the BS #2 240. If the cloud cell communication is used for only one of a downlink data service and an uplink data service, a parameter for a used service is only shared among the BSs which consist of the cloud cell.

Messages related to the network entry procedure among the MS 200, the BS #1 210 and the BS #2 240 in steps 318 to 319, 322 to 325, 331 to 332, 334 to 335, 338 to 341, and 344 to 345 include parameters used for the MS 200 to perform the network entry procedure with the cloud cell member BSs included in the cloud cell and to perform a data transmitting/receiving operation. Here, the parameters are set to a value which all of the cloud cell member BSs included in the cloud cell, i.e., the BS #1 210 and the BS #2 240 may support. If all of the cloud cell member BSs included in the cloud cell may not support the same value, all of the cloud cell member BSs are not selected as cloud cell member BSs for the MS 200. Selecting or deleting a cloud cell member BS according to a parameter value to be used in a cooperative communication with the MS 200 is performed during a cloud cell formation negotiation procedure in steps 307 to 308 or a network entry procedure in steps 313 to 345. On the other hand, the parameter is set to a value which the cloud cell member BSs, i.e., each of the BS #1 210 and the BS #2 240 supports. If the parameter is set to a value different per each cloud cell member BS, the parameter is included into a network entry procedure associated message transmitted from the MS, or network entry procedure associated message received in the MS 200.

Figure 3:
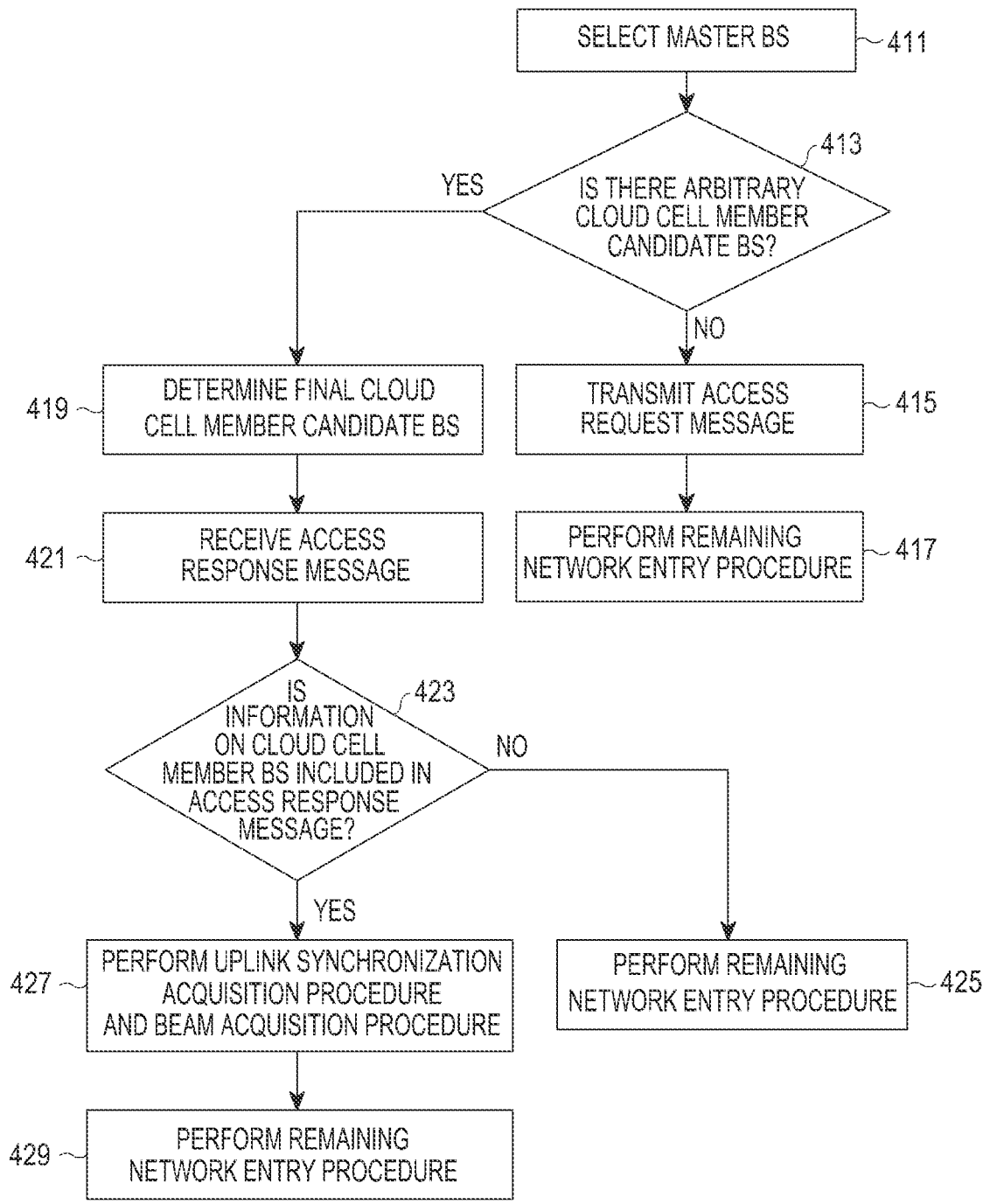
FIG. 3 is a flowchart illustrating a process for performing a network entry procedure in a Mobile Station (MS) in a cloud cell communication system according to an exemplary embodiment of the present invention.

FIG. 3 is a flowchart illustrating a process for performing a network entry procedure in an MS in a cloud cell communication system according to an exemplary embodiment of the present invention.

Referring to FIG. 3, an MS selects a master BS among cloud cell member candidate BSs in step 411. The selecting operation is performed in a manner described before with reference to FIGS. 2A to 2C. The MS determines whether there is an arbitrary cloud cell member candidate BS as a cloud cell member candidate BS which has transmitted a downlink SCH signal with an SINR, which has a difference from an SINR of a downlink SCH signal which has been transmitted from the master BS is less than a preset threshold SINR difference value A in step 413. If there is no arbitrary cloud cell member candidate BS, the MS transmits an access request message to the master BS in step 415. Since there is no arbitrary cloud cell member candidate BS, that is, there is no cloud cell member candidate BS which may transmit a signal to the MS by cooperating with the master BS, the access request message does not include information on a cloud cell member candidate BS in step 415. An operation from steps 411 to 415 corresponds to a cloud cell member BS selection procedure. The MS performs a remaining network entry procedure with the master BS.

If there is the arbitrary cloud cell member candidate BS, the MS determines the arbitrary cloud cell member candidate BS as a final cloud cell member candidate BS, and transmits an access request message including information on the final cloud cell member candidate BS to the master BS in step 419. The information on the final cloud cell member candidate BS may include downlink SCH signal information, BS ID information, and SINR information of a downlink SCH signal, and further include an optimal beam ID for the final cloud cell member candidate BS if the cloud cell communication system supports a beamforming scheme.

The MS receives an access response message as a response message to the access request message from the master BS in step 421. The MS determines whether the access response message includes information on a cloud cell member BS in step 423. Here, steps 411 to 413, and 419 to 423 correspond to a cloud cell formation procedure. If the access response message does not include the information on the cloud cell member BS, the MS performs a remaining network entry procedure with the master BS in step 425.

If the access response message includes the information on the cloud cell member BS, the MS performs a cooperative communication procedure for performing a cooperative communication with the cloud cell member BS, i.e., an uplink synchronization acquisition procedure and a beam acquisition procedure in step 427. Here, steps 411 to 413, 419 to 423, and 427 correspond to a cloud cell formation procedure. The MS performs a remaining network entry procedure with the master BS and the cloud cell member BS in step 429.

Figure 4:
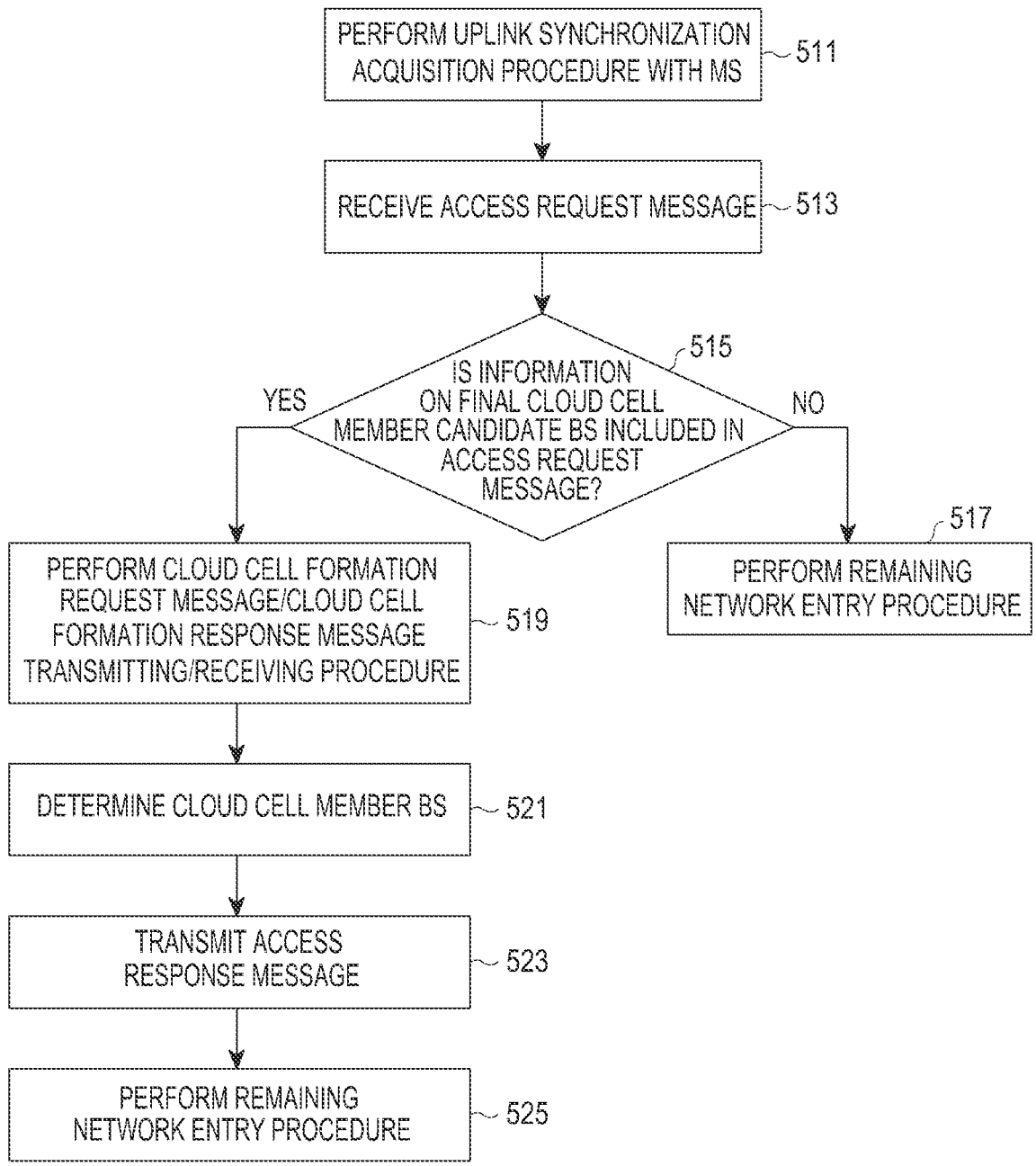
FIG. 4 is a flowchart illustrating a process for performing a network entry procedure in a master Base Station (BS) in a cloud cell communication system according to an exemplary embodiment of the present invention.

FIG. 4 is a flowchart illustrating a process for performing a network entry procedure in a master BS in a cloud cell communication system according to an exemplary embodiment of the present invention.

Referring to FIG. 4, a master BS performs an uplink synchronization acquisition procedure with an MS in step 511. The uplink synchronization acquisition procedure is performed in a manner described before with reference to FIGS. 2A to 2C. The master BS receives an access request message from the MS in step 513.

The master BS determines whether the access request message includes information on a final cloud cell member candidate BS in step 515. The information on the final cloud cell member candidate BS may include downlink SCH signal information, BS ID information, and SINR information of a downlink SCH signal, and further include an optimal beam ID for the final cloud cell member candidate BS if the cloud cell communication system supports a beamforming scheme. Here, steps 511 to 515 correspond to a cloud cell formation procedure. If the access request message does not include information on the final cloud cell member candidate BS, the master BS performs a remaining network entry procedure with the MS in step 517.

If the access request message includes information on the final cloud cell member candidate BS, the master BS performs a negotiation procedure for forming the final cloud cell member candidate BS as a cloud cell member BS, i.e., a procedure for transmitting/receiving a cloud cell formation request message/cloud cell formation response message with the final cloud cell member candidate BS in step 519. The master BS determines the final cloud cell member candidate BS as a cloud cell member BS using the information acquired in the negotiation procedure for forming the final cloud cell member candidate BS as the cloud cell member BS in step 521. The master BS transmits an access response message including information on the determined cloud cell member BS to the MS in step 523. Here, steps 511 to 515, and 519 to 523 correspond to a cloud cell formation procedure. The master BS performs a remaining network entry procedure with the MS and the cloud cell member BS in step 525.

Figure 5:
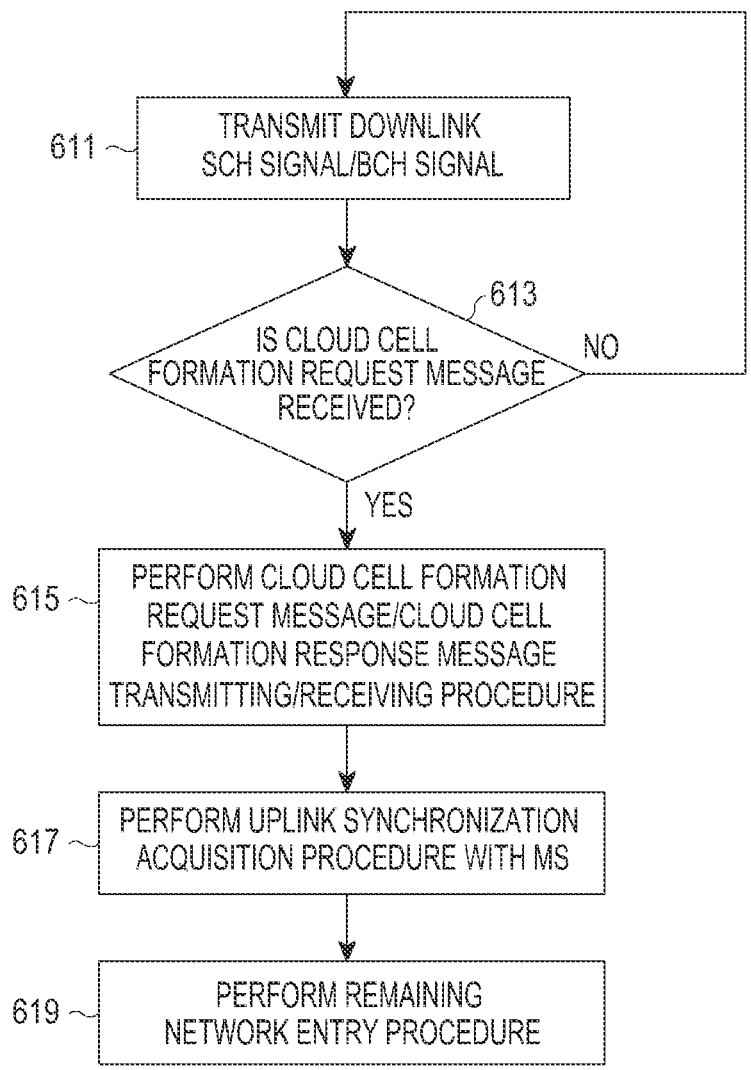
FIG. 5 is a flowchart illustrating a process for performing a network entry procedure in a cloud cell member candidate BS in a cloud cell communication system according to an exemplary embodiment of the present invention.

FIG. 5 is a flowchart illustrating a process for performing a network entry procedure in a cloud cell member candidate BS in a cloud cell communication system according to an exemplary embodiment of the present invention.

Referring to FIG. 5, a cloud cell member candidate BS transmits a downlink SCH signal and a BCH signal in step 611. The cloud cell member candidate BS determines whether a cloud cell formation request message is received from a master BS in step 613. If the cloud cell formation request message is not received from the master BS, the cloud cell member candidate BS returns to step 613.

If the cloud cell formation request message has been received from the master BS, the cloud cell member candidate BS proceeds to step 615. Here, the fact that the cloud cell formation request message has been received from the master BS means that the cloud cell member candidate BS became a final cloud cell member candidate BS.

The cloud cell member candidate BS performs a negotiation procedure for forming the cloud cell member candidate BS as a cloud cell member BS, i.e., a procedure for transmitting/receiving a cloud cell formation request message/cloud cell formation response message with the master BS in step 615. The cloud cell member candidate BS performs an uplink synchronization acquisition procedure with a related MS in step 617. The cloud cell member candidate BS performs a remaining network entry procedure with the MS in step 619.

Figure 6:
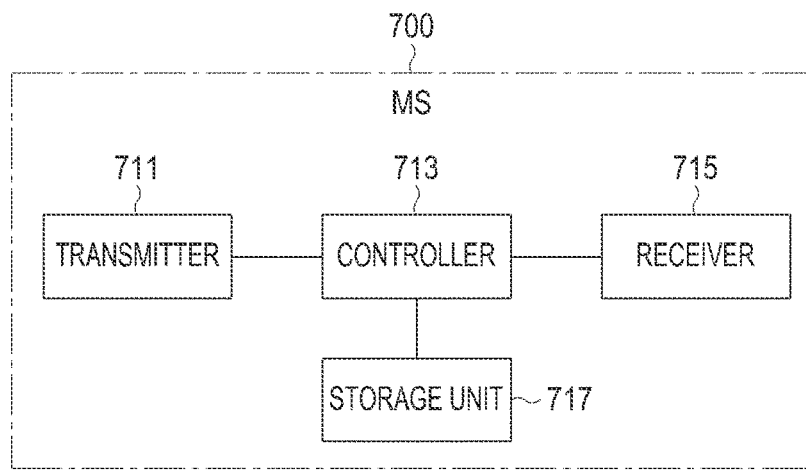
FIG. 6 schematically illustrates an internal structure of an MS in a cloud cell communication system according to an exemplary embodiment of the present invention.

FIG. 6 schematically illustrates an internal structure of an MS in a cloud cell communication system according to an exemplary embodiment of the present invention.

Referring to FIG. 6, an MS 700 includes a transmitter 711, a controller 713, a receiver 715, and a storage unit 717.

The controller 713 controls the overall operation of the MS 700, and controls the overall operation related to a network entry procedure described before with reference to FIGS. 2A to 2C, and FIG. 3. The storage unit 717 stores a program and data related to an operation of the MS 700.

The transmitter 711 transmits messages to a master BS, cloud cell member candidate BSs and cloud cell member BSs under a control of the controller 713. The receiver 715 receives messages from the master BS, the cloud cell member candidate BSs and the cloud cell member BSs under a control of the controller 713.

While the receiver 711, the controller 713, the transmitter 715, and the storage unit 717 are shown in FIG. 6 as separate units, it is to be understood that this is for merely convenience of description. In other words, the receiver 711, the controller 713, the transmitter 715, and the storage unit 717 may be incorporated into a single unit.

Figure 7:
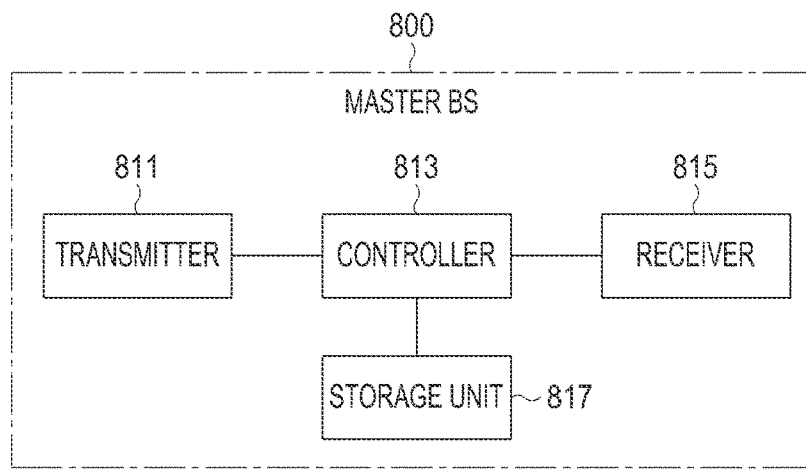
FIG. 7 schematically illustrates an internal structure of a master BS in a cloud cell communication system according to an exemplary embodiment of the present invention.

FIG. 7 schematically illustrates an internal structure of a master BS in a cloud cell communication system according to an exemplary embodiment of the present invention.

Referring to FIG. 7, a master BS 800 includes a transmitter 811, a controller 813, a receiver 815, and a storage unit 817.

The controller 813 controls the overall operation of the master BS 800, and controls the overall operation related to a network entry procedure described before with reference to FIGS. 2A to 2C, and FIG. 4. The storage unit 817 stores a program and data related to an operation of the master BS 800.

The transmitter 811 transmits messages to an MS, cloud cell member candidate BSs and cloud cell member BSs under a control of the controller 813. The receiver 815 receives messages from the MS, the cloud cell member candidate BSs and the cloud cell member BSs under a control of the controller 813.

While the receiver 811, the controller 813, the transmitter 815, and the storage unit 817 are shown in FIG. 7 as separate units, it is to be understood that this is for merely convenience of description. In other words, the receiver 811, the controller 813, the transmitter 815, and the storage unit 817 may be incorporated into a single unit.

Figure 8:
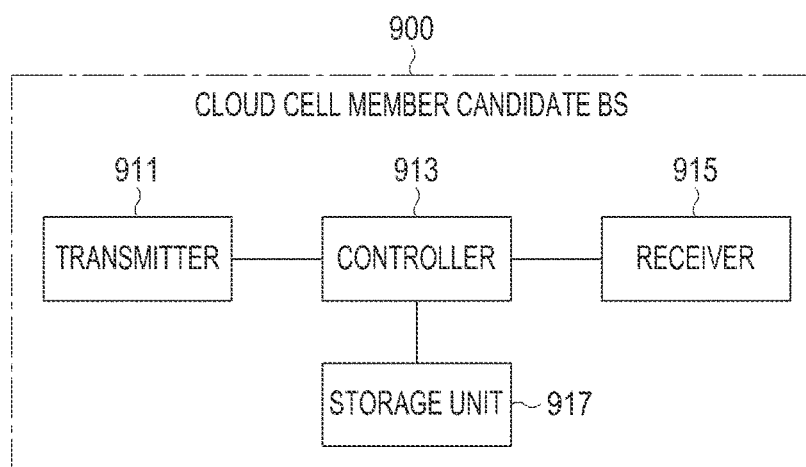
FIG. 8 schematically illustrates an internal structure of a cloud cell member candidate BS in a cloud cell communication system according to an exemplary embodiment of the present invention.

FIG. 8 schematically illustrates an internal structure of a cloud cell member candidate BS in a cloud cell communication system according to an exemplary embodiment of the present invention.

Referring to FIG. 8, a cloud cell member candidate BS 900 includes a transmitter 911, a controller 913, a receiver 915, and a storage unit 917.

The controller 913 controls the overall operation of the cloud cell member candidate BS 900, and controls the overall operation related to a network entry procedure described before with reference to FIGS. 2A to 2C, and FIG. 5. The storage unit 917 stores a program and data related to an operation of the cloud cell member candidate BS 900.

The transmitter 911 transmits messages to an MS, a master BS and cloud cell member candidate BSs under a control of the controller 913. The receiver 915 receives messages from the MS, the master BS and the cloud cell member candidate BSs under a control of the controller 913.

While the receiver 911, the controller 913, the transmitter 915, and the storage unit 917 are shown in FIG. 8 as separate units, it is to be understood that this is for merely convenience of description. In other words, the receiver 911, the controller 913, the transmitter 915, and the storage unit 917 may be incorporated into a single unit.

Figure 9:
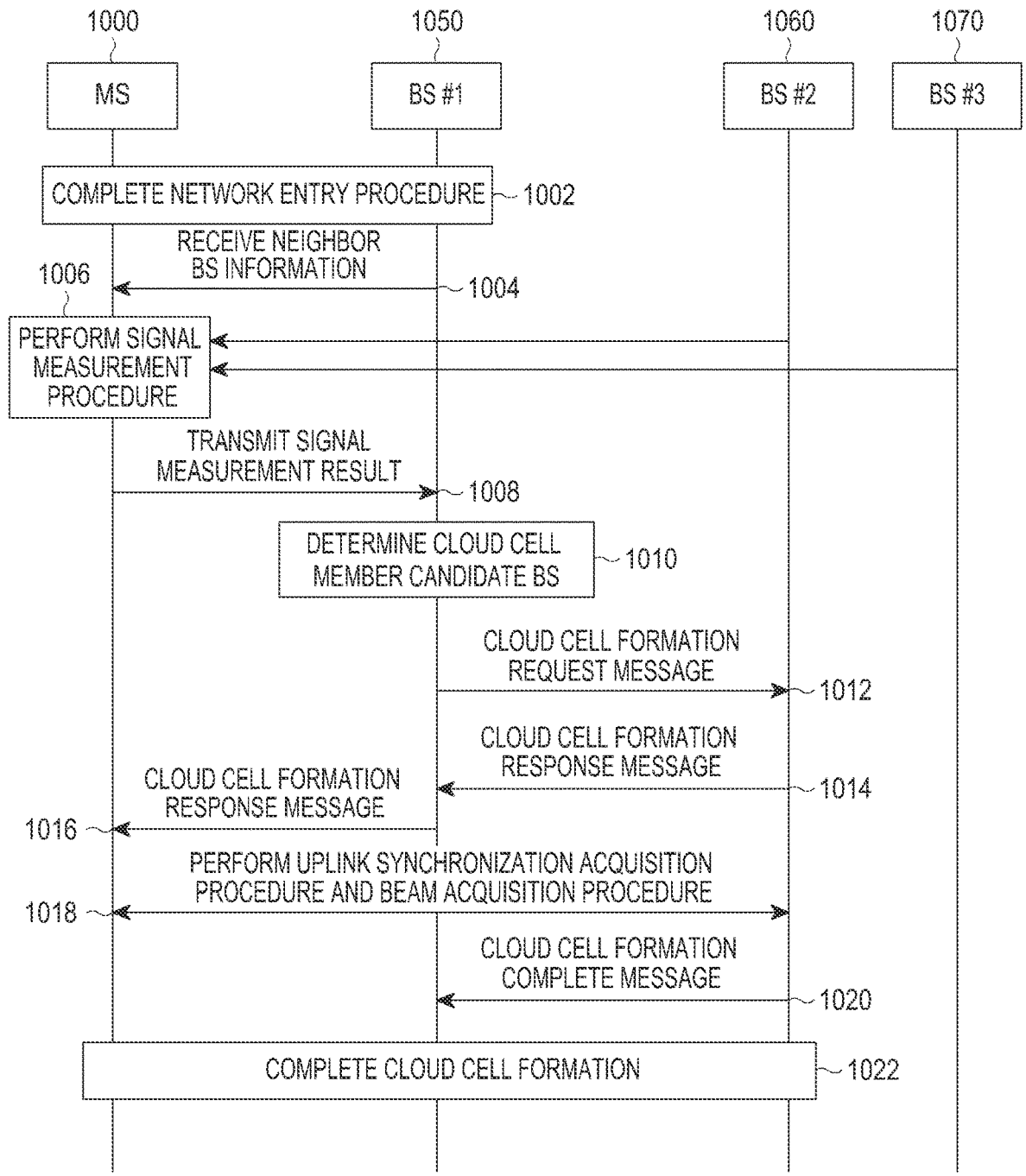
FIG. 9 schematically illustrates a process for forming a cloud cell after completing a network entry procedure in a cloud cell communication system according to an exemplary embodiment of the present invention.

FIG. 9 schematically illustrates a process for forming a cloud cell after completing a network entry procedure in a cloud cell communication system according to the present invention.

Referring to FIG. 9, the cloud cell communication system includes an MS 1000, a BS #1 1050, a BS #2 1060, and a BS #3 1070.

The MS 1000 completes a network entry procedure with a BS #1 1050 in step 1002, and receives information on neighbor BSs, e.g., the BS #2 1060 and the BS #3 1070, i.e., neighbor BS information from the BS #1 1050 in step 1004. The MS 1000 performs a signal measurement procedure for the BS #2 1060 and the BS #3 1070 corresponding to the neighbor BS information in step 1006, and reports the signal measurement result to the BS #1 1050 in step 1008. If the cloud cell communication system supports a beamforming scheme, the signal measurement result for the neighbor BSs reported in step 1008 may include an optimal beam identifier for the neighbor BSs.

For example, a criteria used for reporting the signal measurement result may be set as a case where SINRs of the downlink SCH signals transmitted from the BS #2 1060 and the BS #3 1070 are equal to or greater than a threshold SINR, or a case where a difference value between the SINRs of the downlink SCH signals transmitted from the BS #2 1060 and the BS #3 1070 and an SINR of the downlink SCH signal transmitted from the BS #1 1050 is less than a threshold SINR difference value.

The BS #1 1050 determines whether there is a need for forming a cloud cell for the MS 1000 based on the signal measurement result received from the MS 1000. The BS #1 1050 determines a cloud cell member candidate BS for the MS 1000 based on the signal measurement result received from the MS 1000, locations of the MS 1000, the BS #2 1060 and the BS #3 1070, amount of used resources/ available resources for the BS #1 1050, the BS #2 1060 and the BS #3 1070, etc. in step 1010. In FIG. 9, it will be assumed that the BS #2 1060 is determined as a cloud cell member candidate BS for the MS 1000.

The BS #1 1050 transmits a cloud cell formation request message to the BS #2 1060 as the determined a cloud cell member candidate BS in step 1012. The cloud cell formation request message includes an MS ID, and further includes a beam ID for the BS #2 1060 selected by the MS 1000 if the cloud cell communication system supports a beamforming scheme. Further, the cloud cell formation request message includes cloud cell security key information and service connection information for the MS 1000, e.g., a service connection ID, service QoS parameter information, etc.

After receiving the cloud cell formation request message, the BS #2 1060 performs a cloud cell member BS join procedure for joining the BS #2 1060 as a cloud cell member BS for the MS 1000, and transmits a cloud cell formation response message as a response message to the cloud cell formation request message to the BS #1 1050 in step 1014. The cloud cell formation response message includes uplink random access information for the BS #2 1060, and the uplink random access information includes RACH information. The cloud cell member BS join procedure includes a signal transmitting/receiving procedure among each BS, a gateway connected to each BS, and an AAA server, e.g., a path establishment procedure used for the BS #1 1050 and the BS #2 1060 to provide a cooperative communication to the MS 1000.

After receiving the cloud cell formation response message from the BS #2 1060, the BS #1 1050 transmits a cloud cell formation notification message to the MS 1000 in step 1016. The cloud cell formation notification message includes information on the BS #2 1060 as a cloud cell member BS which is formed as a cloud cell, i.e., cloud cell member BS information, and the cloud cell member BS information includes a BS ID of a related BS and random access information.

After receiving the cloud cell formation notification message, the MS 1000 performs a cooperative communication procedure for performing a cooperative communication with the BS #2 1060, i.e., an uplink synchronization acquisition procedure and a beam acquisition procedure using information included in the cloud cell formation notification message in step 1018. After completing the cooperative communication procedure, the BS #2 1060 transmits a cloud cell formation complete message to the BS #1 1050 in step 1020. The cloud cell formation complete message includes MS ID information of the MS 1000. Hence, a forming a cloud cell in which the BS #1 1050 is a master BS and the BS #2 1060 is a slave BS is completed in step 1022.

In FIG. 9, the formed cloud cell may be applied if all of the cloud cell member candidate BSs selected in step 1010 are used for providing a multiple cooperative communication to the MS 1000, or the BS #1 1050 separately selects a cloud cell member candidate BS which provides the multiple cooperative communication to the MS 1000 by applying another threshold SINR different from the threshold SINR applied to forming the cloud cell.

Figure 10A:
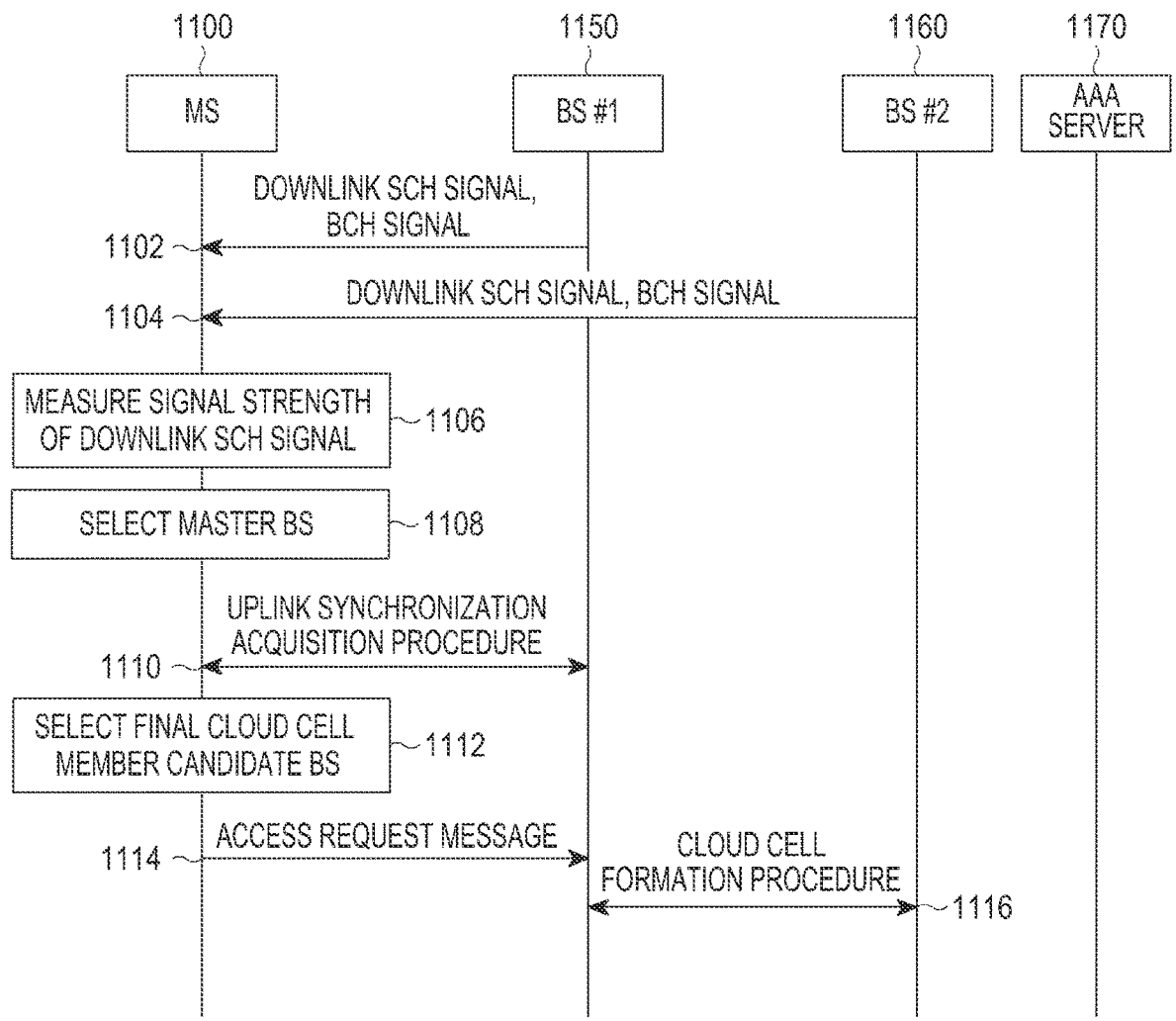
FIGS. 10A to 10B are signal flow diagrams schematically illustrating a process for performing a network entry procedure in a cloud cell communication system according to another exemplary embodiment of the present invention.
Figure 10B:
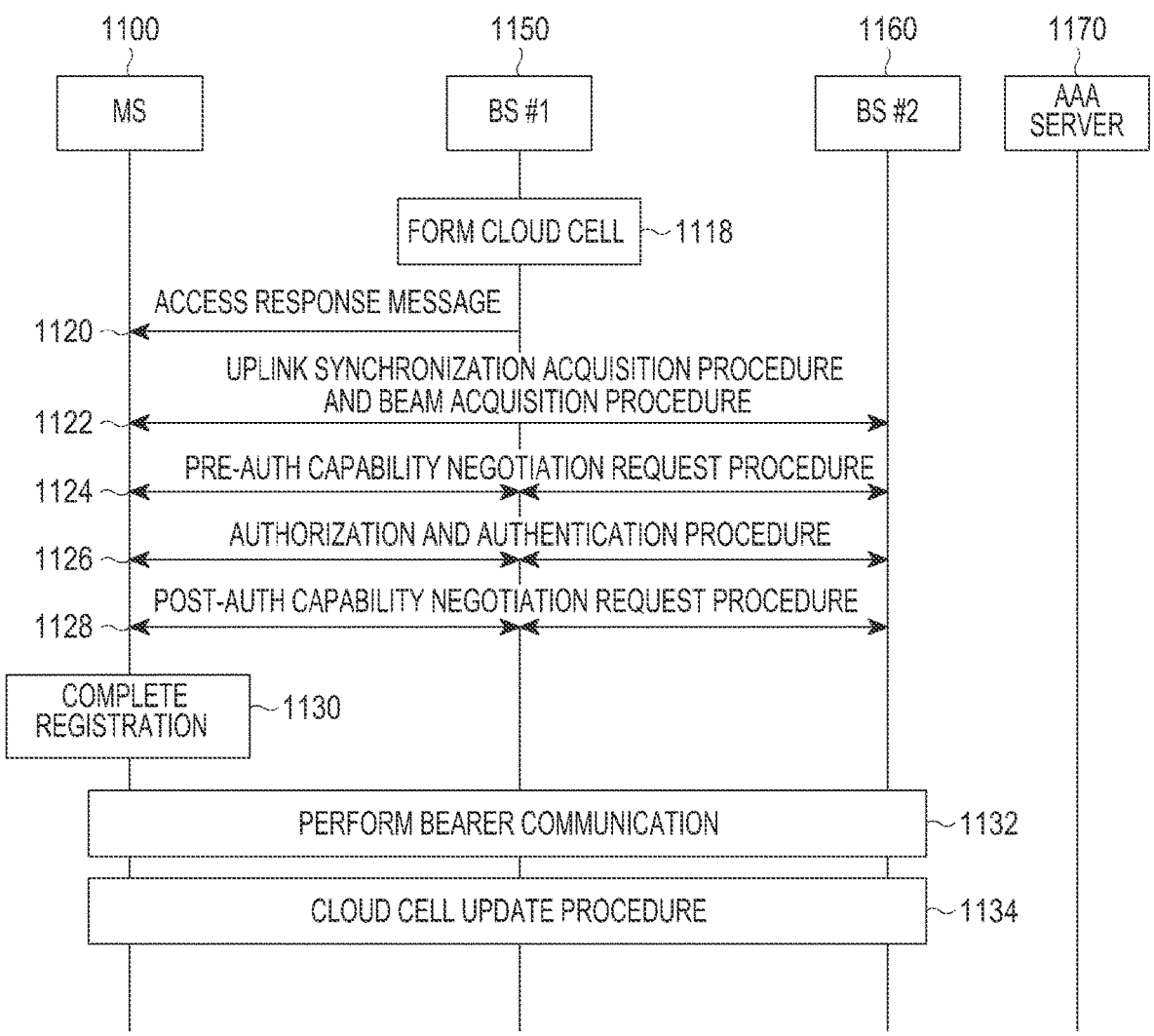

FIGS. 10A to 10B are signal flow diagrams schematically illustrating a process for performing a network entry procedure in a cloud cell communication system according to another exemplary embodiment of the present invention.

Referring to FIGS. 10A to 10B, the cloud cell communication system includes an MS 1100, a BS #1 1150, a BS #2 1160, and an AAA server 1170. In FIGS. 10A to 10B, each of the BS #1 1150 and the BS #2 1160 may be implemented as an entity including a gateway. In FIGS. 10A to 10B, cloud cell member candidate BSs are the BS #1 1150 and the BS #2 1160, however, it will be understood by those of ordinary skill in the art that the number of the cloud cell member candidate BSs is not limited.

Each of the BS #1 1150 and the BS #2 1160 transmits a downlink SCH signal and a BCH signal in steps 1102 and 1104. If the cloud cell communication system supports a beamforming scheme, the BCH signal transmitted from each of the BS #1 1150 and the BS #2 1160 includes a beam ID as well as system information. In FIGS. 10A to 10B, a downlink synchronization signal is the downlink SCH signal, however, it will be understood by those of ordinary skill in the art that the downlink synchronization signal is changed to another signal from which an MS 1100 may acquire synchronization as well as the downlink SCH signal. The MS 1100 receives the downlink SCH signal and the BCH signal transmitted from each of the BS #1 1150 and the BS #2 1160, and measures signal strength, e.g., an SINR of the received downlink SCH signal in step 1106. In FIGS. 10A to 10B, the signal strength is the SINR, however, it will be understood by those of ordinary skill in the art that the signal strength may be an SNR, or a RSSI. If there is an SINR greater than or equal to a preset threshold SINR among the measured SINRs, the MS 1100 stores information on a BS which has transmitted a downlink SCH signal with the SINR greater than or equal to the threshold SINR. In FIGS. 10A to 10B, the cloud cell member candidate BSs are the BS #1 1150 and the BS #2 1160, however, it will be understood by those of ordinary skill in the art that there may be more than three cloud cell member candidate BSs, so there are plurality of cloud cell member candidate BSs which have transmitted a downlink SCH signal with an SINR greater than or equal to the threshold SINR.

In FIGS. 10A to 10B, it will be assumed that the BS #1 1150 and the BS #2 1160 are cloud cell member candidate BSs which have transmitted a downlink SCH signal with an SINR greater than or equal to the threshold SINR. The threshold SINR is an SINR which is determined by considering channel status on which link status on which the MS 1100 may normally perform a network entry procedure may be provided, and it will be understood by those of ordinary skill in the art that a scheme for determining the threshold SINR may be implemented in various forms. If the cloud cell communication system supports a beamforming scheme, the MS 1100 selects a master BS by performing a beam acquisition procedure on which the MS 1100 measures an SINR for a downlink SCH signal and selects an optimal beam direction by considering each beam direction in step 1108. The MS 1100 does not perform a beam acquisition procedure for all cloud cell member candidate BSs, but only performs a beam acquisition procedure for a cloud cell member candidate BS which has transmitted a downlink SCH signal with an SINR equal to or greater than the threshold SINR. In FIGS. 10A to 10B, it will be assumed that each of downlink SCH signals which have been transmitted from the BS #1 1150 and the BS #2 1160 has an SINR equal to or greater than the threshold SINR, so the MS 1100 performs the beam acquisition procedure for each of the BS #1 1150 and the BS #2 1160. In FIGS. 10A to 10B, it will be assumed that an SINR of a downlink SCH signal which has transmitted from the BS #1 1150 has a maximal SINR among SINRs of downlink SCH signals which have transmitted from all of the cloud cell member candidate BSs, so the BS #1 1160 becomes a master BS of the MS 1100.

The MS 1100 performs an uplink synchronization acquisition procedure with the BS #1 1150 as the master BS in step 1110. The MS 1100 determines whether there is an arbitrary cloud cell member candidate BS as a cloud cell member candidate BS which has transmitted a downlink SCH signal with an SINR, which has a difference from an SINR of a downlink SCH signal which has been transmitted from the BS #1 1150 is less than a preset threshold SINR difference value A, and selects a final cloud cell member candidate BS according to the determined result in step 1112. The threshold SINR difference value is determined by considering an SINR on which a cooperative communication gain may be acquired if the master BS, i.e., the BS #1 1150 and an arbitrary BS perform cooperative communication. That is, the threshold SINR difference value is set for selecting a cloud cell member candidate BS which may perform cooperative communication with the master BS, i.e., the BS #1 1150 upon performing the network entry procedure for the MS 1100. If there is the arbitrary cloud cell member candidate BS, the MS 1100 selects the arbitrary cloud cell member candidate BS as the final cloud cell member candidate BS. In FIGS. 10A to 10B, it will be assumed that the BS #2 1160 is selected as the final cloud cell member candidate BS.

The MS 1100 transmits an access request message to the BS #1 1150 in step 1114. The access request message includes information on the selected final cloud cell member candidate BS, i.e., the BS #2 1160, and the information on the selected final cloud cell member candidate BS includes information on the downlink SCH signal which has transmitted from the arbitrary cloud cell member candidate BS, BS ID information, SINR information of the downlink SCH signal. If the cloud cell communication system supports a beamforming scheme, the information on the selected final cloud cell member candidate BS includes optimal beam ID information selected for the final cloud cell member candidate BS. If the MS 1100 performs a cloud cell communication through one or more than BSs, the information on the selected final cloud cell member candidate BS includes capability information which the MS 1100 may support.

The BS #1 1150 performs a cloud cell formation procedure in step 1116 for including the final cloud cell member candidate BS, i.e., BS #2 1160 to a cloud cell member BS based on the access request message, and a detailed description is provided below.

The BS #1 1150 transmits a cloud cell formation request message to the BS #2 1160. The cloud cell formation request message includes an MS ID of the MS 1100, and a beam ID for the BS #2 1160 which the MS 1100 has selected if the cloud cell communication system supports the beamforming scheme. The cloud cell formation request message includes indication information indicating whether the BS #2 1160 will use a cloud cell upon serving downlink data and uplink data, or downlink data, or uplink data for the MS 1100. The cloud cell formation request message may include capability information used for the BS #2 1160 to provide cloud cell communication to the MS 1100 by cooperating with the BS #1 1150 based on the capability information, and the capability information includes system load information of the BS #2 1160, BS communication capability information of the BS #2 1160, etc.

The cloud cell formation response message includes capability information used for the BS #2 1160 to provide cloud cell communication to the MS 1100, and the capability information includes the BS communication capability information of the BS #2 1160, the system load information of the BS #2 1160, etc. If the BS #2 1160 joins in a cloud cell communication for providing uplink data service for the MS 1100, the cloud cell formation response message includes uplink random access information for the BS #2 1160, and the uplink random access information includes RACH information. Upon receiving the cloud cell formation request message from the BS #1 1150, the BS #2 1160 performs a cloud cell member BS join procedure for joining the BS #2 1160 to a cloud cell member BS for the MS 1100, and transmits a cloud cell formation response message as a response message to the cloud cell formation request message to the BS #1 1150. The uplink random access information includes information on a dedicated uplink random access resource which only the MS 1100 may use. The cloud cell formation response message includes CQI information which the MS 1100 will use for communicating with the BS #2 1160 and HARQ channel information. The cloud cell member BS join procedure includes a signal transmitting/receiving procedure between the AAA server 1170 and a gateway, and includes a path establishment procedure used for the BS #1 1150 and the BS #2 1160 to provide a cooperative communication to the MS 1100, etc. The cloud cell member BS join procedure may include various procedures as well as the path establishment procedure, a detailed description for the cloud cell member BS join procedure will be omitted for brevity.

After completing the cloud cell formation procedure described in step 1116, a cloud cell including the BS #2 1160 as a slave BS is formed in step 1118. Here, if a slave BS for the MS 1100 is not determined, a cloud cell for the MS 1110 only including the BS #1 1150 is formed.

The BS #1 1150 receiving the cloud cell formation response message from the BS #2 1160 transmits an access response message as a response message to the access request message to the MS 1100 in step 1120. The access response message includes cloud cell member BS information for the BS #2 1160 as a cloud cell member BS which is formed as a cloud cell for the MS 1100. The cloud cell member BS information includes a BS ID, uplink random access information, CQI channel information, HARQ channel information for a related BS. The access response message includes capability information which the MS 1100 should support upon performing cloud cell communication through the one or more than BSs.

After receiving the access response message from the BS #1 1150, the MS 1100 performs a cooperative communication procedure for performing cooperative communication with the BS #2 1160, i.e., uplink synchronization acquisition procedure and a beam acquisition procedure using information included in the access response message in step 1122. Upon completing the cooperative communication procedure with the MS 1100, the BS #2 1160 transmits a cloud cell formation complete message to the BS #1 1150.

After completing the cloud cell formation, the MS 1100 performs a pre-auth capability negotiation request procedure with the BS #1 1150 and the BS #2 1160 through a cloud cell communication service in step 1124. In the pre-auth capability negotiation request procedure, the MS 1100 further negotiates capability information used for performing a communication using a multiple BS cooperative scheme with the BS #1 1150 and the BS #2 1160. The capability information includes information used for the MS 1100 to receive a downlink service and an uplink service using the multiple BS cooperative scheme.

After completing the pre-auth capability negotiation request procedure described in step 1124, the MS 1100 performs an authorization and authentication procedure using a multiple BS cooperative scheme with the BS #1 1150 and the BS #2 1160 in step 1126. The authorization and authentication procedure includes an MS security context establishment procedure performed with the AAA server 1170, and is performed using an MS ID of the MS 1100. Here, there may be various schemes for performing the authorization and authentication procedure, and a detailed description thereof will be omitted for brevity. The authorization and authentication procedure described in step 1126 includes a cloud cell based security key processing procedure for generating security information used for a cloud cell operation used for serving the MS 1100.

After the authorization and authentication procedure, the MS 1100 performs a post-auth capability negotiation request procedure through a multiple BS cooperative scheme between the BS #1 1150 and the BS #2 1160 in step 1128. After completing the post-auth capability negotiation request procedure, the MS 1110 successfully completes a registration to a network in step 1130.

The MS 1100 performs a bearer communication using a multiple BS cooperative communication between the BS #1 1150 and the BS #2 1160 in step 1132. The MS 1100, the BS #1 1150 and the BS #2 1160 may perform a cloud cell update procedure in which a cloud cell member BS for the MS 1100 is changed in step 1134.

As is apparent from the foregoing description, the exemplary embodiments of the present invention enable an MS to reliably perform a network entry procedure in a cloud cell communication system, hence total system performance of the cloud cell communication system increases.

In addition, the exemplary embodiments of the present invention enable an MS to perform a network entry procedure using a multiple BS cooperative scheme in a cloud cell communication system, hence total system reliability of the cloud cell communication system increases.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for performing a network entry procedure by a mobile station (MS) in a cooperative communication system, the method comprising:

identifying, by the MS, a final candidate base station (BS) which performs a cooperative communication with a serving BS among a plurality of candidate BSs;

transmitting, by the MS, an access request message including first information including a beam identifier (ID) selected for the final candidate BS to the serving BS; and receiving, by the MS, an access response message including second information including random access information and channel information to be used in a communication between the MS and the final candidate BS as being included as a member BS in a cooperative cell from the serving BS, wherein the cooperative cell includes the serving BS and the final candidate BS as member BSs, wherein a strength of a signal which the serving BS transmits among signals which the plurality of candidate BSs transmit is the strongest, and wherein a difference value between a strength of a signal which the final candidate BS transmits and the strength of the signal which the serving BS transmits is less than a threshold difference value.

2. The method of claim 1, further comprising:
performing a pre-authentication capacity negotiation procedure with the serving BS and the final candidate BS; and
performing a post-authentication capacity negotiation procedure with the serving BS and the final candidate BS.

3. The method of claim 1, wherein the threshold difference value is determined based on a signal strength on which a cooperative communication gain may be acquired if the serving BS and the final candidate BS perform the cooperative communication.

4. The method of claim 1, further comprising:
if the cooperative communication system uses a beamforming scheme, performing a beam acquisition procedure for the serving BS and the final candidate BS.

5. A method for performing a network entry procedure by a serving base station (BS) in a cooperative communication system, the method comprising:
receiving, by the serving BS, an access request message including first information including a beam identifier (ID) selected for a final candidate BS which performs a cooperative communication with the serving BS among a plurality of candidate BSs from a mobile station (MS);
performing, by the serving BS, a cooperative procedure for including the final candidate BS in a cooperative cell;
including, by the serving BS, the final candidate BS as a member BS in the cooperative cell; and
transmitting an access response message including second information including random access information and channel information to be used in a communication between the MS and the final candidate BS from the serving BS to the MS,
wherein the cooperative cell includes the serving BS and the final candidate BS as member BSs,
wherein a strength of a signal which the serving BS transmits among signals which the plurality of candidate BSs transmit is the strongest, and
wherein a difference value between a strength of a signal which the final candidate BS transmits and the strength of the signal which the serving BS transmits is less than a threshold difference value.

6. The method of claim 5, further comprising:
performing a pre-authentication capacity negotiation procedure for the MS with the MS and the final candidate BS; and
performing a post-authentication capacity negotiation procedure for the MS with the MS and the final candidate BS.

7. The method of claim 5, wherein the threshold difference value is determined based on a signal strength on which a cooperative communication gain may be acquired if the serving BS and the final candidate BS perform the cooperative communication.

8. The method of claim 5, wherein the performing of the cooperative procedure for including the final candidate BS to the cell with the final candidate BS comprises:
transmitting a cooperative cell formation request message including information on the MS to the final candidate BS; and
receiving a cooperative cell formation response message as a response message to the cooperative cell formation request message from the final candidate BS.

9. A method for performing a network entry procedure by a final candidate base station (BS) among a plurality of candidate BSs in a cooperative communication system, the method comprising:
receiving, at the final candidate BS which performs a cooperative communication with a serving BS, a cooperative cell formation request message for including the final candidate BS to a cooperative cell from the serving BS, the cooperative cell formation request message including an identifier (ID) of a mobile station (MS), a beam identifier (ID) selected by the MS for the final candidate BS, random access information, and channel information to be used in a communication between the MS and the final candidate BS;
performing, by the final candidate BS, a join procedure for joining the final candidate BS as a member BS in the cooperative cell; and
transmitting a cooperative cell formation response message as a response message to the cooperative cell formation request message from the final candidate BS to the serving BS,
wherein the cooperative cell includes the serving BS and the final candidate BS as member BSs,
wherein a strength of a signal which the serving BS transmits among signals which the plurality of candidate BSs transmit is the strongest, and
wherein a difference value between a strength of a signal which the final candidate BS transmits and the strength of the signal which the serving BS transmits is less than a threshold difference value.

10. The method of claim 9, further comprising:
performing a pre-authentication capacity negotiation procedure for the MS with the MS and the serving BS; and
performing a post-authentication capacity negotiation procedure for the MS with the MS and the serving BS.

11. The method of claim 9, wherein the threshold difference value is determined based on a signal strength on which a cooperative communication gain may be acquired if the serving BS and the final candidate BS perform the cooperative communication.

12. A mobile station (MS) comprising:
at least one processor configured to:
identify a final candidate base station (BS) which performs a cooperative communication with a serving BS among a plurality of candidate BSs; and
a transceiver configured to:
transmit an access request message including first information including a beam identifier (ID) selected for the final candidate BS to the serving BS, and
receive an access response message including second information including random access information and channel information to be used in a communication between the MS and the final candidate BS as being included as a member BS in a cooperative cell from the serving BS,
wherein cooperative cell includes the serving BS and the final candidate BS as member BSs,
wherein a strength of a signal which the serving BS transmits among signals which the plurality of candidate BSs transmit is the strongest, and
wherein a difference value between a strength of a signal which the final candidate BS transmits and the strength of the signal which the serving BS transmits is less than a threshold difference value.

13. The MS of claim 12, wherein the transceiver is further configured to:

perform a pre-authentication capacity negotiation procedure with the serving BS and the final candidate BS, and perform a post-authentication capacity negotiation procedure with the serving BS and the final candidate BS.

14. The MS of claim 12, wherein the threshold difference value is determined based on a signal strength on which a cooperative communication gain may be acquired if the serving BS and the final candidate BS perform cooperative communication.

15. The MS of claim 12, wherein, the transceiver is further configured to perform a beam acquisition procedure for the serving BS and the final candidate BS if the cooperative communication system uses a beamforming scheme.

16. A serving base station (BS) comprising:
a transceiver configured to receive, an access request message including first information including a beam identifier (ID) selected for a final candidate BS which performs a cooperative communication with the serving BS among a plurality of candidate BSs from a mobile station (MS); and
at least one processor configured to perform a cooperative procedure for including the final candidate BS in a cooperative cell, and include the final candidate BS as a member BS in the cooperative cell,
wherein the transceiver is further configured to transmit an access response message including second information including random access information and channel information to be used in a communication between the MS and the final candidate BS from the serving BS to the MS,
wherein the cooperative cell includes the serving BS and the final candidate BS as member BSs,
wherein a strength of a signal which the serving BS transmits among signals which the plurality of candidate BSs transmit is the strongest, and
wherein a difference value between a strength of a signal which the final candidate BS transmits and the strength of the signal which the serving BS transmits is less than a threshold difference value.

17. The serving BS of claim 16, wherein, the at least one processor is further configured to:
perform a pre-authentication capacity negotiation procedure for the MS with the MS and the final candidate BS, and
perform a post-authentication capacity negotiation procedure for the MS with the MS and the final candidate BS.

18. The serving BS of claim 16, wherein the threshold difference value is determined based on a signal strength on which a cooperative communication gain may be acquired if the serving BS and the final candidate BS perform the cooperative communication.

19. The serving BS of claim 16, wherein the transceiver is further configured to:
transmit a cooperative cell formation request message including information related to the MS to the final candidate BS, and
receive a cooperative cell formation response message as a response message to the cooperative cell formation request message from the final candidate BS.

20. A final candidate base station (BS) comprising:
a transceiver configured to receive, a cooperative cell formation request message for including the final candidate BS which performs a cooperative communication with a serving BS among a plurality of candidate BSs to a cooperative cell from the serving BS, the cooperative cell formation request message including an identifier (ID) of a mobile station (MS), a beam identifier (ID) selected by the MS for the final candidate BS, random access information, and channel information to be used in a communication between the MS and the final candidate BS; and
at least one processor configured to perform a join procedure for joining the final candidate BS as a member BS,
wherein the transceiver is further configured to transmit a cooperative cell formation response message as a response message to the cooperative cell formation request message to the serving BS,
wherein the cooperative cell includes the serving BS and the final candidate BS as member BSs,
wherein a strength of a signal which the serving BS transmits among signals which the plurality of candidate BSs transmit is the strongest, and
wherein a difference value between a strength of a signal which the final candidate BS transmits and the strength of the signal which the serving BS transmits is less than a threshold difference value.

21. The final candidate BS of claim 20, wherein the at least one processor is further configured to:
perform a pre-authentication capacity negotiation procedure for the MS with the MS and the serving BS, and
perform a post-authentication capacity negotiation procedure for the MS with the MS and the serving BS.

22. The final candidate BS of claim 20, wherein the threshold difference value is determined based on a signal strength on which a cooperative communication gain may be acquired if the serving BS and the final candidate BS perform the cooperative communication.

* * * * *